(12) United States Patent
Bhagavatula et al.

(10) Patent No.: US 7,483,569 B2
(45) Date of Patent: Jan. 27, 2009

(54) REDUCED COMPLEXITY CORRELATION FILTERS

(75) Inventors: Vijayakumar Bhagavatula, Upper St. Clair, PA (US); Marios Savvides, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 623 days.

(21) Appl. No.: 10/857,072

(22) Filed: May 28, 2004

(65) Prior Publication Data

US 2005/0018925 A1   Jan. 27, 2005

Related U.S. Application Data

(60) Provisional application No. 60/474,019, filed on May 29, 2003.

(51) Int. Cl.
*G06K 9/00* (2006.01)
*G06K 9/36* (2006.01)

(52) U.S. Cl. ........................ 382/181; 382/280

(58) Field of Classification Search .............. 342/196; 382/181, 272, 278, 217–220, 118, 115, 280, 382/117; 708/404, 422, 424; 348/78, 342, 348/345, 346
See application file for complete search history.

(56) References Cited

U.S. PATENT DOCUMENTS

| | | | |
|---|---|---|---|
| 5,024,508 A * | 6/1991 | Horner | 359/561 |
| 5,291,560 A | 3/1994 | Daugman | |
| 5,485,312 A * | 1/1996 | Horner et al. | 359/561 |
| 5,781,044 A * | 7/1998 | Riley et al. | 327/105 |
| 5,947,413 A * | 9/1999 | Mahalanobis | 244/3.17 |
| 6,753,919 B1 | 6/2004 | Daugman | |
| 2005/0018925 A1 * | 1/2005 | Bhagavatula et al. | 382/278 |

OTHER PUBLICATIONS

J. Horner, et al., Two-bit correlation, Applied Optics, Sep. 1985, vol. 24, No. 18, pp. 2889-2893.*

M. Savvides, et al., Quad Phase Minimum Average Correlation Energy Filters for Reduced Memory Illumination Tolerant Face Authentication, pp. 56-63, not dated.

(Continued)

*Primary Examiner*—Sherali Ishrat
(74) *Attorney, Agent, or Firm*—Jones Day; Edward L. Pencoske

(57) ABSTRACT

A methodology is described to reduce the complexity of filters for face recognition by reducing the memory requirement to, for example, 2 bits/pixel in the frequency domain. Reduced-complexity correlations are achieved by having quantized MACE, UMACE, OTSDF, UOTSDF, MACH, and other filters, in conjunction with a quantized Fourier transform of the input image. This reduces complexity in comparison to the advanced correlation filters using full-phase correlation. However, the verification performance of the reduced complexity filters is comparable to that of full-complexity filters. A special case of using 4-phases to represent both the filter and training/test images in the Fourier domain leads to further reductions in the computational formulations. This also enables the storage and synthesis of filters in limited-memory and limited-computational power platforms such as PDAs, cell phones, etc. An online training algorithm implemented on a face verification system is described for synthesizing correlation filters to handle pose/scale variations. A way to perform efficient face localization is also discussed. Because of the rules governing abstracts, this abstract should not be used to construe the claims.

12 Claims, 10 Drawing Sheets

OTHER PUBLICATIONS

M. Savvides, et al., Efficient Design of Advanced Correlation Filters for Robust Distortion-Tolerant Face Recognition, pp. 64-71, not dated.

J.L. Horner, et al., Phase-only matched filtering, Applied Optics, vol. 23, pp. 812-816, Mar. 1984.

J. L. Horner et al., Pattern recognition with binary phase-only filters, Applied Optics, vol. 24, pp. 330-332 (1985).

B. Kumar, Minimum-variance synthetic discriminant functions, Journal of Optical Society of America, vol. 3, pp. 1579-1584 (1986).

B. Kumar, Effect of Signal Bandwidth on the Accuracy of Signal Reconstruction from Its Phase, IEEE Trans. Acoustics, Speech, and Signal Proc, vol. 32, No. 6, 1238-1239, (1984).

S. Pillai, et al., Image Reconstruction from One Bit of Phase Information, Journal of Visual Communication and Image Representation, vol. 1, No. 2, 153-157, (1990).

A.V. Oppenheim, et al., The Importance of Phase in Signals, Proc. IEEE vol. 69, No. 5, pp. 529-541 (1981).

T. Sim, et al., The CMU Pose, Illumination, and Expression (PIE) Database of Human Faces, Tech. Report CMU-RI-TR-01-02, Robotics Institute, Carnegie Mellon Univ., Jan. 2001.

M. Savvides, et al., Face Verification using Correlation Filters, Proc. Of Third IEEE Automatic Identification Advanced Technologies, Tarrytown, NY, pp. 56-61 (2002).

B. Kumar, Tutorial survey of composite filter designs for optical correlators, Applied Optics, vol. 31, No. 23, pp. 4773-4801 (1992).

R. Nichols, Biometric Encryption, ICSA Guide to Cryptography, Ch. 22, Journal of Cognitive Neuroscience, 3(1), pp. 71-86 (1991).

B. Kumar, et al., Spatial Frequency Domain Image Processing for Biometric Recognition, Proc. Of Intl. Conf on Image Processing (ICIP), Rochester, NY, Sep. 2002.

B. Javidi, et al., Fully phase encoded key and biometrics for security verification, Opt. Eng, vol. 36(3), pp. 935-942, (1997).

A. Mahalanobis, et al., Minimum average correlation energy filters, Applied Optics, vol. 26, pp. 3633-3640 (1987).

Daugman, John, "The importance of being random: statistical principles of iris recognition," Dec. 21, 2001, 2002 Pattern Recognition Society, Elsevier Science Ltd.

Duda, et al., Pattern Classification, Chapter 3, 2nd Edition, 2002, Wiley, New York, pp. 114-124.

The homepage at facial expressions database at http://amp.ece.cmu.edu, Advanced Multimedia Processing Lab, Dec. 2, 2004.

Ross, et al., Two-dimensional magneto-optic spatial light modulator for signal processing, Optical Engineering, Jul./Aug. 1983, vol. 22, No. 4, pp. 485-490.

Psaltis, et al., Optical image correlation with a binary spatial light modulator, Optical Engineering, Nov./Dec. 1984, vol. 23, No. 6, pp. 698-704.

Jae S. Lim, Two-dimensional signal and image processing, Prentice Hall, 1990, Chapter 1, pp. 31-42.

Ph. Refregier, et al., Optical image encryption based on input plane and Fourier plane random encoding, Optics Letters, Apr. 1, 1995, vol. 20, No. 7, pp. 767-769.

Dwight O. North, An Analysis of the Factors Which Determine Signal/Noise Discrimination in Pulsed-Carrier Systems, Proceedings of the IEEE, 1963, pp. 1016-1027.

Cottrell, et al., Optical correlator performance of binary phase-only filters using Fourier and Hartley transforms, Applied Optics, Sep. 15, 1987, vol. 26, No. 18, pp. 3755-3761.

Hester, et al., Multivariant technique for multiclass pattern recognition, Applied Optics, Jun. 1, 1980, vol. 19, No. 11, pp. 1758-1761.

Ph.Refregier,Optimal trade-off filters for noise robustness,sharpness of the correlation peak,and Horner efficiency,Optical Society of America, 1991, vol. 16,No. 11, pp. 829-831.

F. Dickey, et al., Quad-phase correlation filters for pattern recognition, Applied Optics, May 1989, vol. 28, No. 9, pp. 1611-1613.

C. Hester, et al., Multivariant technique for multiclass pattern recognition, Applied Optics, Jun. 1980, vol. 19, No. 11, pp. 1758-1761.

A. Mahalanobis, et al., Unconstrained correlation filters, Applied Optics, Jun. 1994, vol. 33, No. 17, pp. 3751-3759.

A. Mahalanobis, et al., Distance-classifier correlation filters for multiclass target recognition, Applied Optics, vol. 35, No. 17, pp. 3127-3133 (1996).

F. Dickey, et al., Complex ternary matched filters yielding high signal-to-noise ratios, Optical Engineering, Sep. 1990, vol. 29, No. 9, pp. 994-1000.

Ph. Refregier, Filter design for optical pattern recognition: multicriteria optimization approach, Optics Letters, Aug. 1990, vol. 15, No. 15, pp. 854-856.

A. Oppenheim, et al., Signal synthesis and reconstruction from partial Fourier-domain information, Optical Society of America, Nov. 1983, vol. 73, pp. 1413-1420.

A. Vander Lugt, Signal Detection by Complex Spatial Filtering, IEEE Transactions on Information Theory, 1964, pp. 139-145.

* cited by examiner

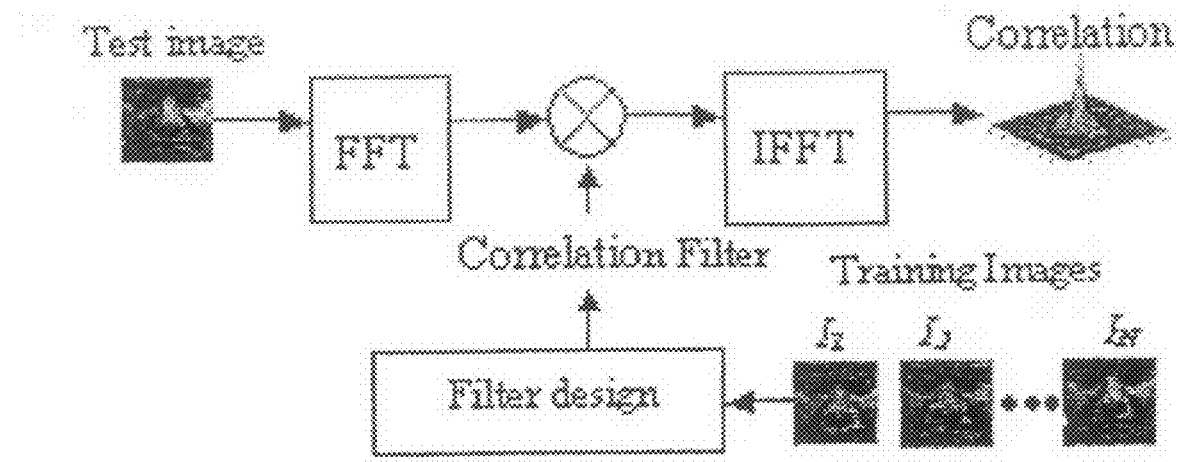
FIG. 1 PRIOR ART
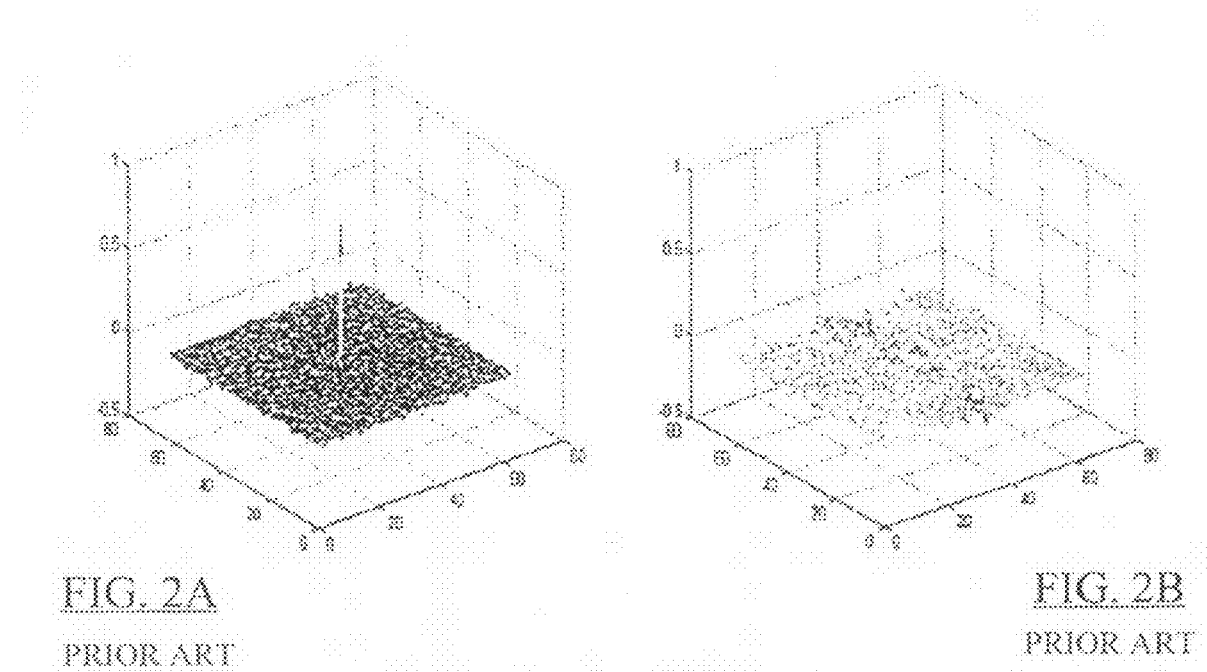
FIG. 2A PRIOR ART
FIG. 2B PRIOR ART
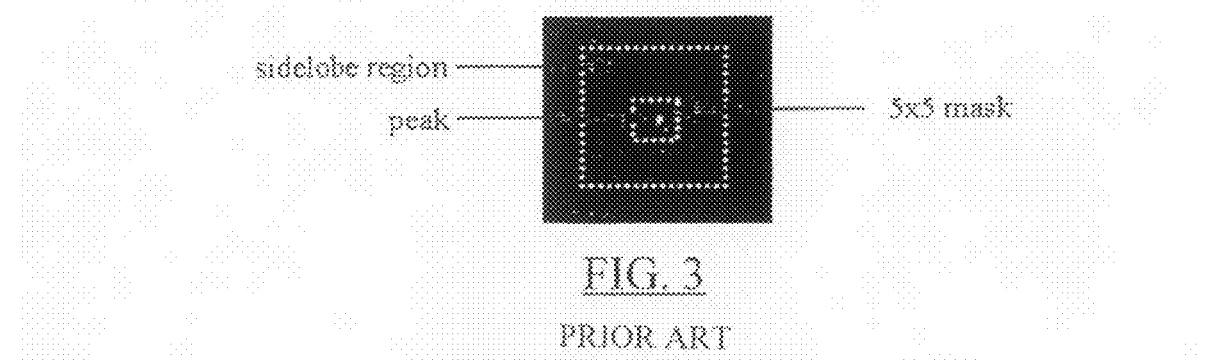
FIG. 3 PRIOR ART

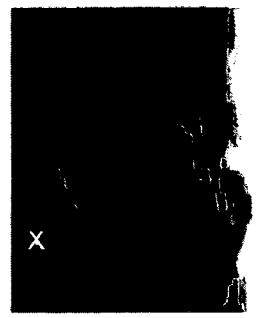 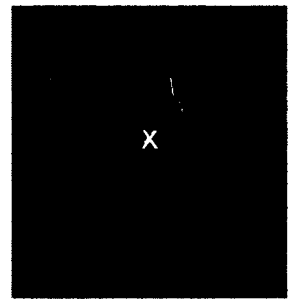
FIG. 15A        FIG. 15B
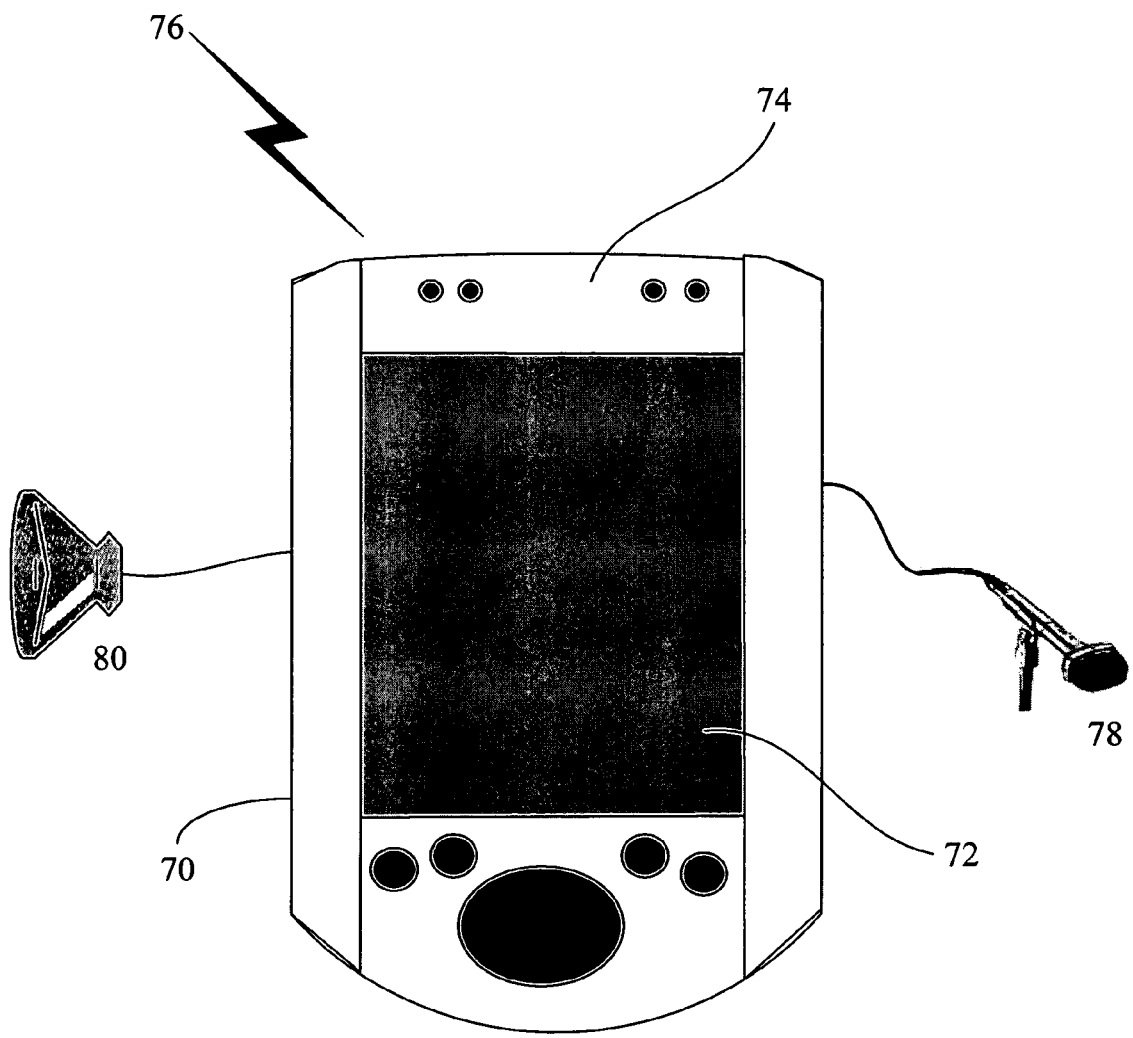
FIG. 16

REDUCED COMPLEXITY CORRELATION FILTERS

REFERENCE TO RELATED APPLICATION

The disclosure in the present application claims priority benefits of the earlier filed U.S. provisional patent application Ser. No. 60/474,019, titled "Reduced Complexity Correlation Filters," filed on May 29, 2003, the entirety of which is hereby incorporated by reference.

BACKGROUND

1. Field of the Disclosure

The present disclosure generally relates to image pattern recognition for use in various applications including automatic target recognition, face recognition, fingerprint recognition, and iris recognition, among others and, more particularly, to image pattern recognition using correlation filters.

2. Brief Description of Related Art

Ever since the advent of the optical frequency plane correlator or correlation filter (A. VanderLugt, *IEEE Trans. Inf. Th.*, 10 (1964) 139), there has been considerable interest in using correlators for pattern recognition. Correlators are shift-invariant filters (i.e., no need to center the input face image during testing), which allow one to locate the object of interest in the input scene merely by locating the correlation peak. Thus, one may not need to segment or register an object in the input scene prior to correlation, as is required in many other image pattern recognition methods. Much of the earlier work in correlation-based pattern recognition was devoted to recognizing military vehicles in scenes. Correlators (or more correctly, correlation filters) can be used for recognition of other patterns such as fingerprints, face images, etc. Authenticating the identity of a user based on their biometrics (e.g., face, iris, fingerprint, voice, etc.) is a growing research topic with wide range of applications in e-commerce, computer security and consumer electronics. In authentication (also termed "verification"), a stored biometric is compared to a live biometric to determine if the live biometric is that of an authorized user or not. There is a wide range of computing platforms that can be used to host biometric authentication systems. With current desktop computing power, researchers may not have to worry about the complexity of the algorithms; however, embedding such verification modules in small form factor devices such as cell phones and PDAs (Personal Digital Assistant) is a challenge as these platforms are limited by their memory and computing power. In applications where these filters are stored directly on a chip (such as in system-on-chip implementations), the memory available may be limited. Therefore, it is desirable to devise correlation filters with reduced memory requirements.

The matched spatial filter (D. O. North, *Proc. IEEE*, 51 (1963) 1016) (MSF) is based on a single view of the target and is optimal (in the sense of yielding maximal signal-to-noise ratio (SNR)) for detecting a completely known pattern in the presence of additive, white noise (noise with equal power at all frequencies). Unfortunately, MSFs are not suitable for practical pattern recognition because their correlation peak degrades rapidly when the input patterns deviate (sometimes even slightly) from the reference. These variations in the patterns are often due to common phenomena such as pose, illumination and scale changes. In optical implementations, the Matched Spatial Filter (MSF) is represented by a transparency, thus the transmittance of the filter is less than or equal to 1 at all spatial frequencies. This causes much of the incoming light to be attenuated causing low levels of light for the detector in the correlation plane. To address this issue, Homer and Gianino (J. L. Homer, and P. D. Gianino, *Appl. Opt.* 23, 812-816, 1984) suggested setting the filter magnitude to 1 at all frequencies. Thus the resulting filter contains only phase information and is known as the Phase-Only Filter (POF). POF has 100% light throughput efficiency.

In optical correlators, matched filters are represented on spatial light modulators (SLMs) which convert electrical inputs to optical properties such as transmittance and reflectance. Examples of SLMs are magneto-optic SLM (MOSLM) and liquid crystal display (LCD). The magneto-optic SLM can be operated in two levels of effective transmittance and to accommodate the limitations of the magneto-optic SLM, Psaltis et al. (D. Psaltis, E. G. Paek, and S. S. Venkatesh, *Opt. Eng*, 23, 698-704, 1984), and Homer and others (J. L. Homer and H. O. Bartlett, *Appl. Opt.* 24, 2889-2893, 1985, J. L. Homer and J. R. Leger, *Appl. Opt.* 24, 609-611, 1985), suggested the use of Binary Phase Only Filters (BPOF) which only use two levels in the filter. Psaltis et al. supra, suggested binarizing the real part of the matched spatial filter, while Homer and others, supra, suggested the binarization of the imaginary part of the matched spatial filter. Later, Cottrell et al. (D. M. Cottrell, R. A. Lilly, J. A. Davis, and T. Day, *Appl. Opt.* 26, 3755-3761, 1987) proposed the binarizing of the sum of the real and imaginary parts of the matched spatial filter. The main attribute of the BPOFs is that they are well suited for implementation on a binary SLM such as the magneto-optic SLM and were not designed specifically for digital implementations.

Dickey and Hansche (F. M. Dickey, and B. D. Hansche, *Appl. Opt.* 28, 1611-1613, 1989) extended the BPOF idea to the Quad-Phase Only Filters (QPOFs), that have 4 possible phase levels (namely $\pm\pi/4$, $\pm 3\pi/4$) which could be implemented using two MOSLMs (each capable of providing only 2 phase levels) to effectively obtain the 4 phases needed in a QPOF. QPOFs are all-pass filters and they are based on a single image. A QPOF is an all-pass filter and has no ability to suppress noise. An effort to improve the signal-to-noise ratio (SNR) of the QPOF led to the development of the complex ternary matched filter (CTMF) defined below (F. M. Dickey, B. V. K. Vijaya Kumar, L. A. Romero, and J. M. Connely, *Opt. Eng.* 29, 994-1001, 1990).

$$H_{CTMF}(u,v) = H_R(u,v) + jH_I(u,v) \quad (1)$$

where $H_R$ (u,v), the real part of the filter transfer function $H_{CTMF}$ and $H_I$ (u,v), the imaginary part of $H_{CTMF}$ take on 3 levels (namely $-1$, 0 and $+1$) at each frequency (u,v).

However all the above filters are made from a single reference image and thus are sensitive to any distortions from this reference image. One approach to overcoming the distortion sensitivity of the MSF is to use one MSF for every view. However, this leads to the requirement to store and use a large number of filters that make this approach impractical. The alternative is to design composite filters that can exhibit better distortion tolerance than the MSFs. Composite filters (also known as Synthetic Discriminant Function or SDF filters)(C. F. Hester and D. Casasent, *Appl. Opt.*, 19 (1980) 1758; B. V. K. Vijaya Kumar, *Appl. Opt.*, 31 (1992) 4773) use a set of training images to synthesize a template that yields pre-specified correlation outputs in response to training images.

If matched filters are used, many filters would be needed, approximately one filter for each view. When one thinks of possible distortions (e.g., illuminations, expressions, pose changes, etc.), this is clearly too many filters to store and use. Therefore, Hester and Casasent, supra, introduced the concept of SDF filters in 1980. The first SDF filter required that the associated composite template be a weighted sum of training images with the weights chosen so that resulting correlation output values at the origin take on pre-specified (non-zero) values. This filter proved to be unattractive as it almost always led to sidelobes that are much larger than the correlation "peak" (the correlation value at the origin is loosely referred to herein as the correlation peak). Kumar (B. V. K. Vijaya Kumar, JOSA-A, 3 (1986) 1579) introduced the minimum variance SDF (MVSDF) formulation that minimized the output noise variance from the SDF filters. The sidelobe problem was addressed by the minimum average correlation energy (MACE) filters introduced by Mahalanobis et al. (A. Mahalanobis et al., Appl. Opt., 26 (1987) 3633). Refregier (Ph. Refregier, Opt. Lett., 16 (1991) 829) showed how to optimally trade off the noise tolerance and peak sharpness attributes of correlation filters. These and many other SDF filter developments were summarized in the tutorial review paper by Kumar (B. V. K. Vijaya Kumar, Appl. Opt., 31 (1992) 4773).

Correlation filters offer several advantages including shift-invariance (i.e., no need to center the input face image during testing), closed-form solutions, graceful degradation (i.e., loss of parts of input image results in slow loss of correlation peak) and ability to design built-in tolerance to normal impairments such as expression, illumination and pose changes. Correlation filters have been used widely in the areas of signal detection and automatic target recognition. As noted before, the matched filter is known to be optimal for detecting a known signal or image in the presence of additive white Gaussian noise (AWGN). When the noisy reference image or signal is input to the matched filter, its output is the cross correlation of the noisy input image with the reference image. If the noisy input contains a replica of the reference, the correlation output will have a large value (the "correlation peak") at a location corresponding to the location of the reference image in the input scene and small values elsewhere. The value of the correlation peak is a measure of the likelihood that the input scene contains the reference image and the location of the peak provides the location of the reference image in the input scene. Thus, matched filters are well suited for both detecting the presence of a reference image in a noisy input scene as well as locating it. However, as noted before, matched filters suffer from the problem that the correlation peak degrades significantly when the target object exhibits appearance changes due to normal factors such as illumination changes, pose variations, facial expressions, etc. Therefore, it is desirable to devise filters that are tolerant to such variability.

There are two main stages in correlation-based pattern recognition. First is the correlation filter design (also called "the enrollment stage") and the second is the use of the correlation filters (also called "the verification stage"). This correlation-based pattern recognition process is shown schematically in FIG. 1.

In the first stage (the enrollment or training stage), training images are used to design the correlation filter. The training images reflect the expected variability in the final image to be verified. For example, in designing a correlation filter for verifying the face of a person A, the person A's face images with a few expected variations (e.g., pose, expression, illumination) are acquired during the enrollment stage. These images are used to construct a correlation filter according to a carefully chosen performance metric and rigorously derived closed-form expressions. Most advanced correlation filter designs are in frequency domain. Thus, the training images are used to construct one or a few frequency-domain arrays (loosely called correlation "filters" or "templates") that are stored in the system. Once the filters are computed, the filter arrays are stored and there is no need to store the training images. The authentication performance of the system depends critically on these stored filters. They must be designed to produce large peaks in response to images (many not seen during training) of the authentic user, small values in response to face images of impostors, and be tolerant to noise in the input images. As some of these goals are conflicting, optimal tradeoffs may be devised.

In the second stage, the input test image (e.g., someone's face image) is presented for verification and/or identification. In verification problems, the user claims his/her identity and the task is to compare the input image to the claimed identity and decide whether they match or not. In the identification problem, the user input is matched against a database of stored images (or equivalently, filters) to see which stored template best matches the input image. In either case, the 2-D (two dimensional) fast Fourier transform (FFT) of the test input is first computed and then multiplied by the stored templates (i.e., filter arrays). Thereafter, an inverse FFT (IFFT) of that product is performed to obtain the correlation output. If the input matches the template/filter, a sharply-peaked correlation output is obtained as in FIG. 2A, and when the two do not match, a correlation output with less sharp peaks as in FIG. 2B is obtained. Thus, one can use sharpness of the correlation peak for verification or identification—sharp correlation peaks relate to the images from the authentic, whereas no large discernible peaks result from face images from impostors. It is noted here that those skilled in the art would recognize that FFT is an efficient algorithm to compute the discrete Fourier transform (DFT) and, hence, the phrases "discrete Fourier transform" or "DFT" and "fast Fourier transform" or "FFT" are used interchangeably herein.

The following figure of merit, known as the peak-to-sidelobe ratio (PSR), is usually employed to measure the peak sharpness: First, the peak (i.e., the largest value) is located in the correlation output, and a small (e.g., of size 5×5) mask is centered at the peak. The sidelobe region is defined as the annular region between this small mask and a larger (e.g., of size 20×20) square also centered at the origin. The annular region may be rectangular or square or in any other suitable polygonal shape. The mean and standard deviation ("$\sigma$") of the sidelobe region are computed and used to estimate the PSR using Eq. (2). PSR estimation is depicted pictorially in FIG. 3.

$$PSR = \frac{\text{peak} - \text{mean}}{\sigma} \qquad (2)$$

The small mask size and the larger square sizes are somewhat arbitrary and are usually decided through numerical experiments. The basic goal is to be able to estimate the mean and the standard deviation of the correlation output near the correlation peak, but excluding the area close to the peak. The PSR is unaffected by any uniform illumination change in the input image. Thus, for example, if the input image is multiplied by a constant "k" (e.g., uniform illumination), the resulting correlation output will also be multiplied by the same factor. Thus, peak, mean and standard deviation all increase by "k", making the PSR invariant to "k." This can be useful in image problems where brightness variations are present. The PSR also takes into account multiple correlation points in the output plane (not just the peak), and thus it can be considered to lead to a more reliable decision. In order for a test image to be declared to belong to the trained class, the correlation peak should not only be large, but the neighboring correlation values should be small. Thus, the final verification decision is based on examining the outputs of many inner products (correlation region around the peak), rather than just one inner product (the correlation peak value).

In the discussion below, 1-D (one dimensional) notation is used for convenience, but all equations can easily be generalized to higher dimensions. Let $f_1(n), f_2(n), \ldots, f_N(n)$ denote the training images (each with L pixels) from the authentic class, and let $F_1(k), F_2(k), \ldots, F_N(k)$ denote their Fourier transforms. Let H(k) denote the filter. Then the correlation output $c_i(n)$ when the input image is $f_i(n)$ is given as follows. Note that $j=\sqrt{-1}$.

$$c_i(n) = \frac{1}{L}\sum_{k=1}^{L} F_i^*(k)H(k)\exp\left[+j\frac{2\pi(k-1)n}{L}\right] \quad (3)$$

In 2-D, let g(m,n) denote the correlation surface produced by the template h(m,n) in response to the input image f(m,n). Strictly speaking, the entire correlation surface g(m,n) is the output of the filter. However, the point g(0,0) is often referred to as "the correlation output or the correlation peak at the origin". By maximizing the correlation output at the origin, the real peak may be forced to be even larger. With this interpretation, the correlation peak is given by $$g(0,0) = \sum\sum f(m,n)h(m,n) = f^T h \quad (4)$$

where superscript T denotes the vector transpose and where f and h are the column vector versions of f(m,n) and h(m,n), respectively. In the discussion hereinbelow, matrices will be represented by upper case bold letters and vectors are by lower case bold letters.

Composite filters are derived from several training images that are representative views of the object or pattern to be recognized. In principle, such filters can be trained to recognize any object or type of distortion as long as the distortion can be adequately represented by the training images. The objective of a composite filter is to be able to recognize the objects from one class (even non-training images), while being able to reject objects from other classes. The optimization of carefully designed performance criteria offers a methodical approach for achieving this objective.

In the early SDF filter designs, the filter was designed to yield a specific value at the origin of the correlation plane in response to each training image. The hope was that such a controlled value would also be the peak in correlation plane. It was further theorized that the resulting filter would be able to interpolate between the training images to yield comparable output values in response to other (non-training) images from the same class. A set of linear equations describing the constraints on the correlation peaks can be written as $$X^+ h = u \quad (5)$$

where h is the filter vector, superscript "+" (in $X^+$) denotes the conjugate transpose, $X=[x_1\ x_2\ \ldots\ x_N]$ is an L×N matrix with the N training image Fourier transform vectors (each with L elements, where L is the number of pixels in the image) as its columns, and $u=[u_1\ u_2\ \ldots\ u_N]^T$ is an N×1 column vector containing the desired peak values for the N training images. For training images from the desired class (also known as the true class), the constraint vales are usually set to 1 and for images from the reject class (also known as the false class), they are usually set to 0.

However, because the number of training images N is generally much fewer than the dimension L (i.e., the number of frequencies) of the filters, the system of linear equations in Eq. (5) is under-determined. By requiring that h is a linear combination of the training images, one can obtain a unique solution known as the equal correlation peak SDF (ECP-SDF).

The ECP-SDF suffers from the problem of large sidelobes. In practice, it is important to ensure that the correlation peak is sharp and that sidelobes are suppressed. One way to achieve this is to minimize the energy in the correlation plane. The minimum average correlation energy (MACE) filter minimizes the average correlation energy (ACE) defined below in Eq. (6) while satisfying the correlation peak constraints in Eq. (5).

$$E_{ave} = \frac{1}{N}\sum_{i=1}^{N}\sum_{k}\sum_{l}|H(k,l)|^2|X_i(k,l)|^2 = h^+ Dh \quad (6)$$

where D is a diagonal matrix containing the average training image power spectrum along its diagonal. This leads to the closed form solution of the MACE filter shown in Eq. (7).

$$h = D^{-1}X(X^+D^{-1}X)^{-1}u \quad (7)$$

In the above equations, input images, frequency domain arrays and correlation outputs are assumed to be of size d×d and "N" is the number of training images. Further, h is a $d^2 \times 1$ column vector containing the 2-D correlation filter H(k,l) lexicographically reordered to 1-D, u is a column vector, and X is a $d^2 \times N$ complex matrix whose ith column contains the 2-D Fourier transform of the ith training image lexicographically reordered into a column vector. As is known in the art, in lexicographical reordering, an image is reordered by scanning it row-by-row and placing all the scanned elements in a vector (e.g., a column vector).

MACE filters have been shown to generally produce sharp correlation peaks. They are the first set of filters that attempted to control the entire correlation plane. However, MACE filters suffer from two main drawbacks. First, there is no built-in immunity to noise. Second, the MACE filters are often excessively sensitive to intra-class variations.

The minimum variance synthetic discriminant function (MVSDF) was developed to address the noise tolerance issue. Here, the filter h was designed to minimize the effect of additive noise on the correlation output. Let the noise be of zero mean and let C be the diagonal noise power spectral density (PSD) matrix in that the PSD of the noise is represented along the diagonal of C. Then the output noise variance (ONV) can be shown to be $\sigma^2 = h^T Ch$. The MVSDF minimizes $\sigma^2$ while satisfying the conditions in Eq. (5). Here, C is a $d^2 \times d^2$ diagonal matrix whose diagonal elements C(k,k) represent the noise power spectral density at frequency k. Minimizing ONV ($\sigma^2$) subject to the usual linear constraints of Eq. (5) leads to the following closed form solution:

$$h = C^{-1}X(X^+C^{-1}X)^{-1}u \quad (8)$$

The ECP-SDF is a special case of MVSDF in that it is obtained if the noise is white, i.e., if C is equal to I, the identity matrix, then the MVSDF is same as the ECP SDF.

The MACE filter yields sharp peaks that are easy to detect while the MVSDF is designed to be more robust to noise.

Since both attributes (namely, sharp peaks and noise tolerance) are desirable in practice, it is desirable to formulate a filter that possesses the ability to produce sharp peaks and behaves robustly in the presence of noise. Refregier, supra, showed that one can optimally trade off between these two metrics (i.e., ONV and ACE). The resulting filter, named the Optimal Trade-off SDF (OTSDF) is given as $$h = T^{-1}X(X^+T^{-1}X)^{-1}u \quad (9)$$

where $T=(\alpha D+\sqrt{1-\alpha^2}C)$, and $1 \geq \alpha \geq 0$. It is noted here that when $\alpha=1$, the optimal tradeoff filter reduces to the MACE filter given in equation (7), and when $\alpha=0$, it simplifies to the noise-tolerant filter in equation (8).

The ECP-SDF filter and its variants such as MVSDF filter and MACE filter assume that the distortion tolerance of a filter could be controlled by explicitly specifying desired correlation peak values for training images. The hard constraints in Eq. (5) may be removed because non-training images always yield different values than those specified for the training images and no formal relation appears to exist between the constraints imposed on the filter output and its ability to tolerate distortions. In fact, it is unclear that even intuitively satisfying choices of constraints (such as the Equal Correlation Peak (ECP) condition) have any significant positive impact on a filter's performance. Finally, relaxing or removing the hard constraints should increase the domain of solutions.

Removing the hard constraints in Eq. (5) led to the introduction of the unconstrained MACE (UMACE) filter (A. Mahalanobis, B. V. K. Vijaya Kumar, S. R. F. Sims and J. F. Epperson, *Appl. Opt.*, 33, 3751-3759,1994). Instead of constraining the peak value at the origin of the correlation output to take on a specific value, UMACE tries to maximize the peak at the origin while minimizing the average correlation energy resulting from the cross-correlation of the training images. This is done by optimizing the metric J(h) in Eq. (10).

$$J(h) = \frac{h^+mm^+h}{h^+Dh} \quad (10)$$

which leads to the closed form solution in Eq. (11) for the UMACE filter.

$$h = D^{-1}m \quad (11)$$

In equations (10) and (11), D is a diagonal matrix as defined earlier, and m denotes the Fourier transform of mean training image. It is noted that both MACE and UMACE filters yield sharp correlation peaks because they are designed to minimize the average correlation energy.

Adding noise tolerance to the UMACE filter, as was done to MACE filters, yields the unconstrained optimal trade-off SDF (UOTSDF) given in Eq. (12).

$$h = (\alpha D+\sqrt{1-\alpha^2}C)^{-1}m \quad (12)$$

Varying $\alpha$ produces filters with optimal tradeoff between noise tolerance and discrimination. Typically, using $\alpha$ values close to, but not equal to 1 (e.g., 0.99) improves the robustness of MACE filters.

Advances in correlation filters include considering the correlation plane as a new pattern generated by the correlation filter in response to an input image. The correlation planes may be considered as linearly transformed versions of the input image, obtained by applying the correlation filter. It can then be argued that if the filter is distortion tolerant, its output will not change much even if the input pattern exhibits some variations. Thus, the emphasis is not only on the correlation peak, but on the entire shape of the correlation surface. Based on the above, a metric of interest is the average variation in images after filtering. If $g_i$ (m,n) is the correlation surface produced in response to the ith training image, we can quantify the variation in these correlation outputs by the average similarity measure (ASM) defined in Eq. (13).

$$ASM = \frac{1}{N}\sum_{i=1}^{N}\sum_{m}\sum_{n}[g_i(m,n)-\bar{g}(m,n)]^2 \quad (13)$$

where $$\bar{g}(m,n) = \frac{1}{N}\sum_{j=1}^{M}g_j(m,n)$$

is the average of the N training image correlation surfaces. ASM is a measure of distortions or dissimilarity (variations) in the correlation surfaces relative to an average shape. In an ideal situation, all correlation surfaces produced by a distortion invariant filter (in response to a valid input pattern) would be the same, and ASM would be zero. In practice, reducing ASM improves the filter stability.

In addition to being distortion-tolerant, a correlation filter must yield large peak values to facilitate detection. Towards this end, one maximizes the filter's response to the training images on the average. However, no hard constraints are imposed on the filter's response to training images at the origin. Rather, it is desired that the filter should yield a large peak on the average over the entire training set. This condition is met by maximizing the average correlation height (ACH) metric defined in Eq. (14).

$$ACH = \frac{1}{N}\sum_{i=1}^{N}x^+h = m^+h \quad (14)$$

where m is the mean of all vectors. It is desirable to reduce the effect of noise by reducing ONV. To make ACH large while reducing ASM and ONV, the filter is designed to maximize the metric in Eq. (15).

$$J(h) = \frac{|ACH|^2}{ASM+ONV} \quad (15)$$

The filter which maximizes this metric is referred to as the maximum average correlation height (MACH) (A. Mahalanobis et al., *Appl. Opt.*, 33 (1994) 3751) filter.

The correlation filters previously described are presented as linear systems whose response to patterns of interest is carefully controlled by various optimization techniques. The correlation filters may also be interpreted as methods of applying transformations to the input data. Thus the correlation can be viewed as a linear transformation. Specifically, the filtering process can be mathematically expressed as multiplication by a diagonal matrix in the frequency domain.

The distance of a vector x to a reference $m_k$ under a linear transform H is given by $$d_k = |Hx - Hm_k|^2 = (x - m_k)^+ H^+ H(x - m_k) \quad (16)$$

where superscript + denotes a conjugate transpose operation.

The filtering process transforms the input images to new images. For the correlation filter to be useful as a transform, it is required that the images of the different classes become as different as possible after filtering. Then, distances can be computed between the transformed input image and the references of the different classes that have been also transformed in the same manner. The input is assigned to the class to which the distance is the smallest. The emphasis is shifted from using just one point (i.e., the correlation peak) to comparing the entire shape of the correlation plane. These facts along with the simplifying properties of linear systems lead to a realization of a distance classifier in the form of a correlation filter. In the distance classifier correlation filter (DCCF) approach (A. Mahalanobis et al., *Appl. Opt.*, 35 (1996) 3127) the transform matrix H is found that maximally separates the classes while making all the classes as compact as possible.

While the various filters discussed can provide good results, the physical implementation often requires complex computations and large memories. Thus, the need exists for a correlation filter that is computationally simple and that requires less memory than the existing art without compromising the results produced by the filter.

SUMMARY

In one embodiment, the present disclosure contemplates a method, which comprises obtaining a Fast Fourier Transform (FFT) of an image; obtaining an M-level quantization of one or more frequency samples contained in the FFT of the image, wherein the M-level quantization produces a set of quantized values; and constructing a filter using the set of quantized values.

In another embodiment, the present disclosure contemplates a computer system configured to perform the following: obtain a Fast Fourier Transform (FFT) of an image; obtain an M-level quantization of one or more frequency samples contained in the FFT of the image, wherein the M-level quantization produces a set of quantized values; and construct a filter using the set of quantized values. A data storage medium containing the program code to enable the computer system to construct such a filter is also contemplated In a further embodiment, the present disclosure contemplates a method to synthesize a correlation filter. The method comprises: obtaining a plurality of images of a subject; building the correlation filter using a first set of images from the plurality of images, wherein the first set contains at least two of the plurality of images; cross-correlating the built correlation filter with a first image in a second set of images from the plurality of images, wherein the second set contains images not contained in the first set of images and wherein the cross-correlation generates a first PSR (Peak-to-Sidelobe Ratio) value; and including the first image in a training set of images for the correlation filter when the first PSR value is less than a first threshold value, wherein the training set of images contains a subset of images from the plurality of images. The present disclosure further contemplates a program code and a computer system to execute the correlation filter synthesis method. The correlation filter may be a MACE (Minimum Average Correlation Energy) filter.

The present disclosure is directed generally to a correlation filter having reduced storage and computational complexity and increased recognition performance. The storage and computational complexity of both the filter and test and training images are reduced by quantizing the filter (in the frequency domain) as well as the Fourier transform of the test image. With modern, fast, digital computers, digital correlations can be implemented in real-time, thus allowing for real-time quantization of the Fourier transform of the test image. One possible example (but not limited to) of such quantization is retaining the phase (i.e., for example, setting the magnitude at all frequencies to unity) and quantizing the phase to N levels. This quantization can be different for the test image (N quantization levels) and filter (M quantization levels), although typically M=N may be set (i.e., both the filter and the Fourier transform of the test image are quantized to the same number of levels). The quantization scheme can (if desired) be different for each (or a group) of frequencies for each of the filter, test, and training array in the frequency domain. In many instances, it may also be desirable to synthesize the filters from these reduced representation training images (in the frequency domain), therefore one can also quantize the Fourier transforms of the training images in the same way, and then synthesize these correlation filters. An online training algorithm implemented on a face verification system is described for synthesizing correlation filters to handle pose/scale variations. A way to perform efficient face localization is also discussed.

BRIEF DESCRIPTION OF THE DRAWINGS

For the present disclosure to be easily understood and readily practiced, the present disclosure will now be described for purposes of illustration and not limitation, in connection with the following figures, wherein:

FIG. 1 is a schematic of correlation-based filter design and pattern recognition;

FIGS. 2A and 2B illustrate correlation outputs for an authentic and impostor, respectively;

FIG. 3 shows the region for estimating the peak-to-sidelobe ratio (PSR);

FIGS. 15A and 15B illustrate the face localization methodology according to one embodiment of the present disclosure; and FIG. 16 illustrates exemplary hardware upon which the methods of the present disclosure may be practiced.

DETAILED DESCRIPTION

Reference will now be made in detail to some embodiments of the present disclosure, examples of which are illustrated in the accompanying figures. It is to be understood that the figures and descriptions of the present disclosure included herein illustrate and describe elements that are of particular relevance to the present disclosure, while eliminating, for the sake of clarity, other elements found in typical digital filters or correlation filters. It is noted at the outset that the terms "connected", "connecting," "electrically connected," etc., are used interchangeably herein to generally refer to the condition of being electrically connected.

Correlation filters owe their origins to optical processing because the 2-D (two dimensional) Fourier transform operation needed for performing 2-D correlations could be naturally accomplished with properties of light such as diffraction and propagation. However, given the current high speeds at which fast Fourier transforms (FFTs) can be implemented, 2-D correlations can be achieved relatively rapidly in current digital implementations. Therefore, the correlation operations discussed hereinbelow are intended for digital implementations. However, it is evident that the filters discussed hereinbelow may be implemented using optical processing as well.

Figure 4:
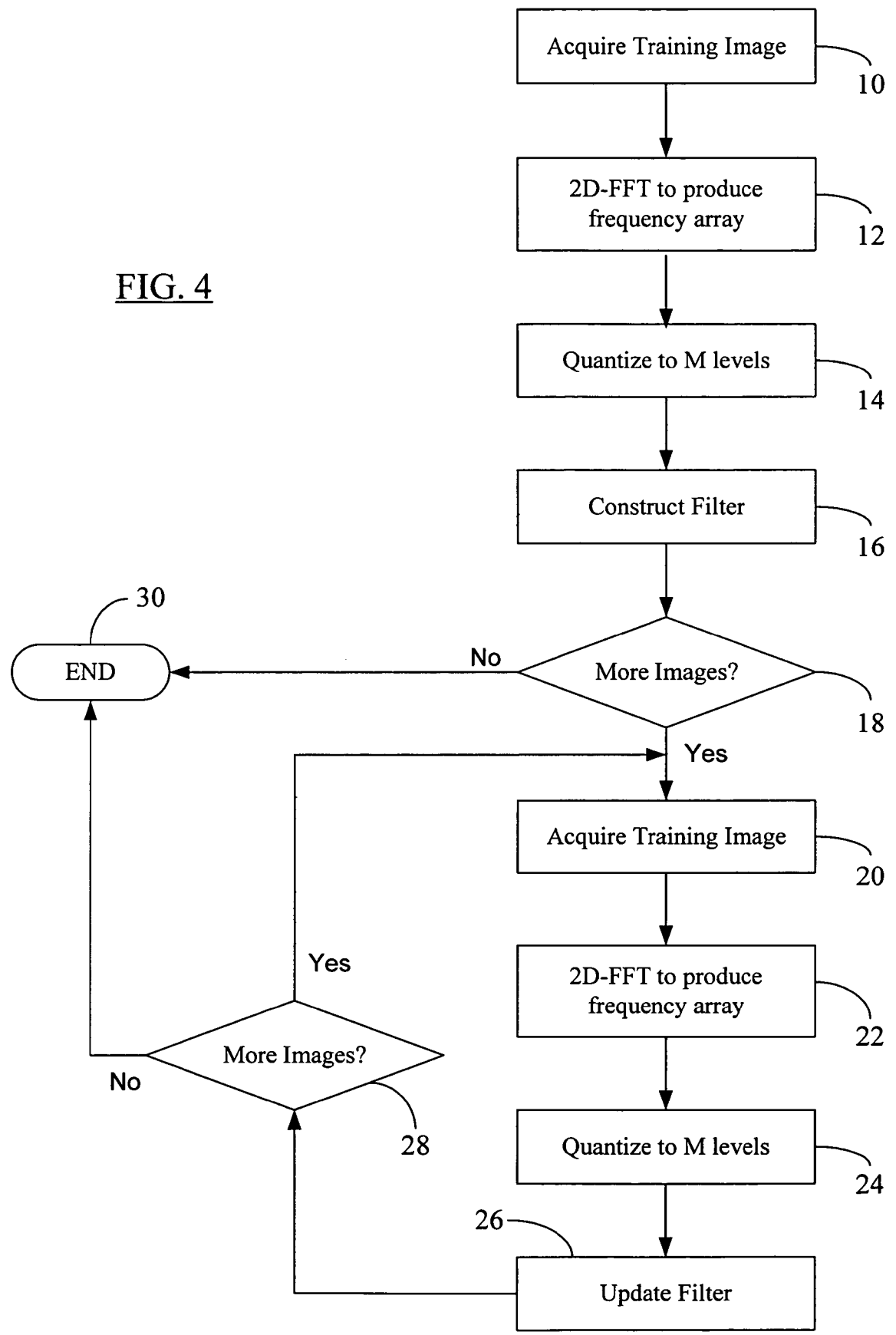
FIG. 4 is a flow chart illustrating an enrollment process according to the present disclosure.

Reduced-complexity correlation filters that maintain good correlation outputs can be achieved by quantizing the Fourier transform of the test/training images in conjunction with using a quantized correlation filter. This scheme may yield large peak values at the origin in the case of MACE type filters, thus providing excellent discrimination performance. FIG. 4 illustrates the enrollment process. In FIG. 4, at step 10, a training image is acquired. At step 12, a 2D Fast Fourier Transform (FFT) is performed to produce a frequency array. At step 14, each entry in the array is quantized to M levels, as will be explained in greater detail below. A filter can be constructed from the quantized data at step 16. At decision step 18, it is determined if more training images are available. If so, the image is acquired, a 2D FFT is performed, and the results quantized at steps 20, 22 and 24, respectively. The results are used to update the filter at step 26. In this manner, an existing filter can be updated or, in the case of initially building a filter, the filter can be incrementally constructed thereby reducing the amount of memory needed during the enrollment phase. If more images are available as shown by step 28, the process repeats. Otherwise, the process ends (block 30).

Figure 5:
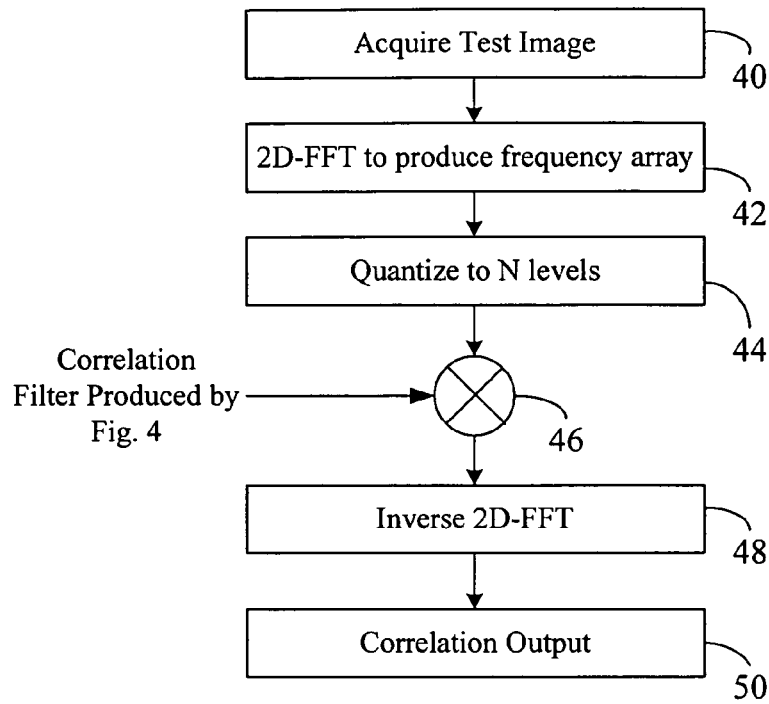
FIG. 5 is a flow chart illustrating a validation process using the reduced-complexity correlation filter of the present disclosure.

FIG. 5. illustrates the discrimination or test phase. The test image is acquired at step 40. A 2D FFT is performed (step 42) and the results quantized to N levels at step 44. The results from the test image are multiplied by the filter produced by the process of FIG. 4 at step 46, and an inverse 2D FFT performed at step 48. The output of the correlation process is available at step 50. It is observed here that FIG. 4 shows that the Fourier transform of the training image is quantized to M levels, and the resulting filter is quantized to P levels (albeit, typically, P is set equal to M (P=M)). However, FIG. 5 shows that the test image is quantized to N levels. That is, the number of quantization levels can be different for each spatial frequency (i.e., N, and M can be a function of spatial frequency "f," i.e., N(f), M(f)). In the special case where the same number of quantization levels is used for all frequencies, it is noted that very good face recognition results may be achieved. In the following discussion, the results shown (without loss of generality) are based on uniform quantization across all frequencies for both filter and Fourier transform of the input images.

Typically, but not limited to, only phase information is retained by setting the magnitude to unity. Then, the phases are quantized to N and M levels for the Fourier transforms of the test image and filter respectively. One example (but not limited to) is setting N=M so that in the case where the test image matches the reference image, the phase of the Fourier Transform of the test image will cancel the phase of the filter, thus yielding a large peak. It is shown below that for N=M=4, very good face verification results may be obtained, while reducing the complexity of performing this task considerably by having filters, and test images, that only require (but not limited to) 2 bits/frequency for storage.

One example (but not limited to) of applying this to the MACE filter—to improve the filter quality without increasing the memory requirements significantly—is to use a 4-phase filter (with phases $\pi/4$, $3\pi/4$, $5\pi/4$, $7\pi/4$) defined below. To prevent the need for one filter for every view (as in the case of MSF, POF, QPOF), this phase quantization may be applied to composite filters such as the MACE filter. The resulting 4-phase MACE filter may be referred to as the Quad-Phase MACE (QPMACE) filter. The QPMACE filters require only a limited number of bits per pixel (e.g., two bits per pixel in the frequency domain) and can be calculated as follows:

$$H_{QP-MACE}(u, v) = \begin{cases} +1 & \text{Re}\{H_{MACE}(u, v)\} \geq 0 \\ -1 & \text{Re}\{H_{MACE}(u, v)\} < 0 \\ +j & \text{Im}\{H_{MACE}(u, v)\} \geq 0 \\ -j & \text{Im}\{H_{MACE}(u, v)\} < 0 \end{cases} \quad (17)$$

where the QP-MACE filter simply retains the sign bits from the real and imaginary components of the MACE filter respectively. That is, the QP-MACE filter may be represented by the following equation for simplicity:

$$H_{QP-MACE}(u,v) = Sgn[Re\{H_{MACE}(u,v)\}] + jSgn[Im\{H_{MACE}(u,v)\}] \quad (17A)$$

Where Sgn[x] is "+1" for x greater than or equal to 0, and "−1" for x<0. Thus, it is clear that the QP-MACE filter simply takes on (±1) and (±j) sign bits.

Figure 6:
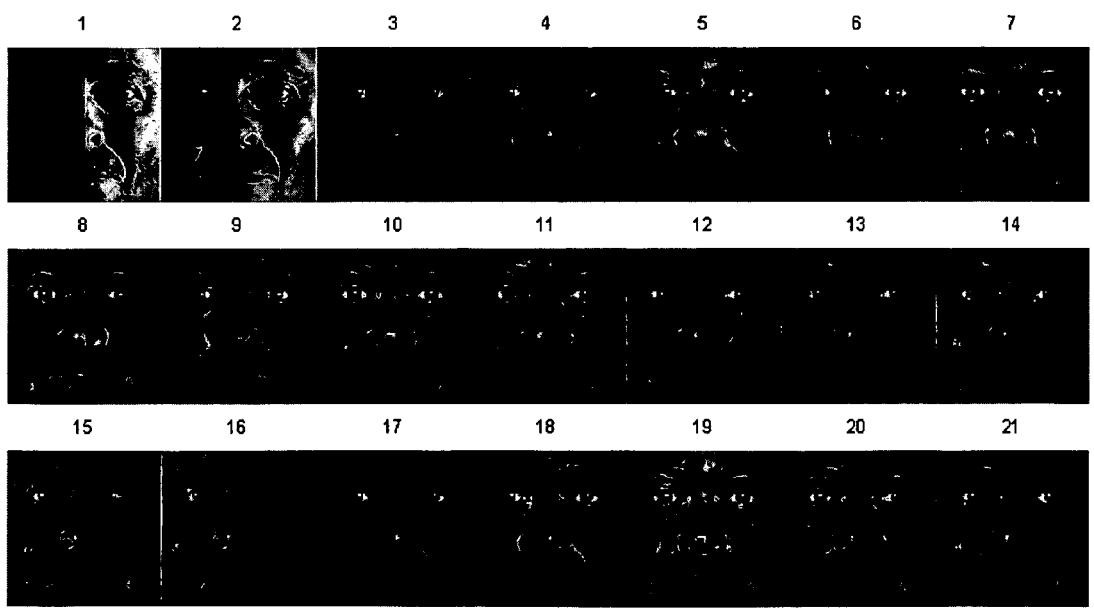
FIG. 6 illustrates sample images from the illumination subset of the Pose, Illumination, Expressions (PIE) database with no background lighting.

To test the performance of these QPMACE filters for the application of face verification, the Pose, Illumination, Expressions (PIE) database collected at the Robotics Institute at Carnegie Mellon University was used. The subset used was the illumination subset, which contains 65 people with approximately 21 images each, captured under two different conditions; one capture session was captured with the lights on (it is referred to herein as the PIE-L subset), and the other was captured with room lights off (it is referred to herein as the PIE-NL subset). FIG. 6 shows a set of example images from person 2.

It is observed that using just QPMACE filter alone does not provide good correlation outputs that are similar to the correlation outputs of a full complexity MACE filter. The exemplary correlation outputs from the MACE filter (FIG. 7A) and the QPMACE filter (FIG. 7B) using full-phase Fourier transform test image are obtained when the test input image is one of the training images from which these filters are designed. As expected, the MACE filter yields a sharp correlation peak (peak value=1.00). However, the correlation output from the QPMACE filter has a less visible peak (peak value=0.08), which is undesirable. Further, the resulting PSR (=9.91) for the QPMACE filter is low compared to the PSR of 66.07 for the full complexity MACE filter. Note that even when QPMACE is being used, the Fourier transform of the input test image can take on all possible phase values and thus it may be referred to as the full phase correlation. It is noted here that the although the discussion herein uses a PSR value as a figure-of-merit (FOM), the discussion is not constrained to use of just the PSR values. Instead, the methodology according to the present disclosure may be used in conjunction with any other computation that produces a similar suitable figure-of-merit.

In an effort to understand why the full phase correlation using QPMACE filters is less than satisfactory, it may be inferred that to get a sharp correlation peak, the product of the Fourier transform of the test image and the filter frequency response must yield something close to a constant value (except for a linear phase term). This may only happen if the phases of the filter frequency response and input image Fourier transform cancel out to yield a constant magnitude.

In the full-complexity MACE filters, both the filter and the input image Fourier transform can take on all possible values and thus there is no difficulty in phases canceling out (assuming that there is no input noise). On the other hand, in the full phase correlation using the QPMACE filters, the filter may take on only one of four phase values (namely $\pi/4$, $3\pi/4$, $5\pi/4$, $7\pi/4$), whereas the input image Fourier transform takes on all possible values. The product of these two values may not be a phase-free term and thus the resulting correlation peak may not be as sharply peaked as desired.

Figure 7A:
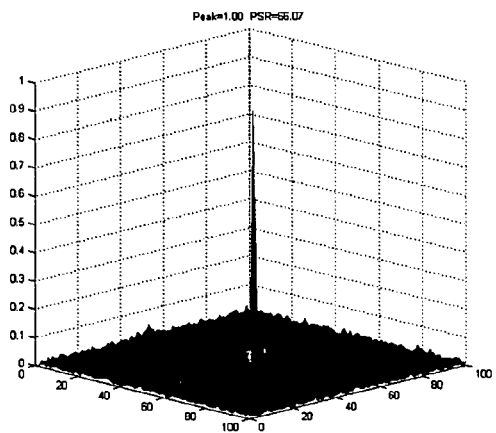
FIGS. 7A and 7B show the minimum average correlation energy (MACE) filter correlation output and the quad phase MACE (QP-MACE) filter correlation output using full phase correlation.
Figure 7B:
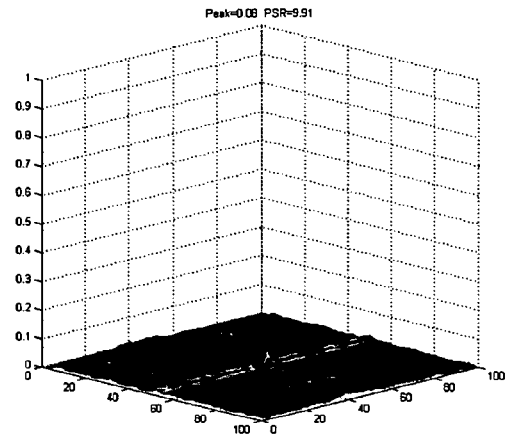
Figure 8A:
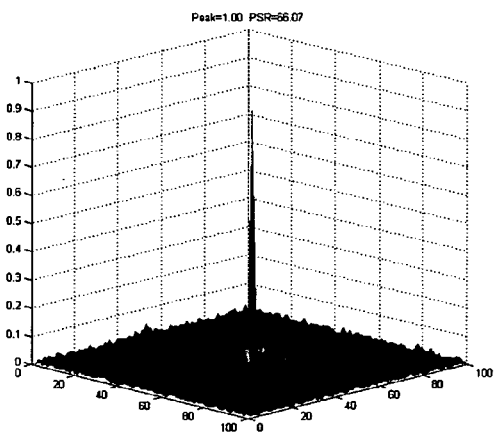
FIGS. 8A and 8B show the MACE filter correlation output and the QP-MACE filter correlation output using a 4-level correlator.
Figure 8B:
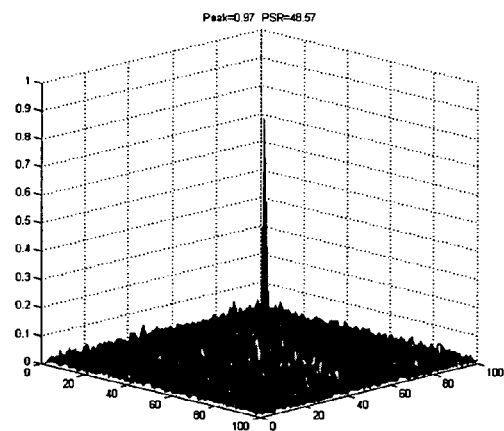

The foregoing suggests that it may be beneficial to quantize the phase of the input image Fourier transform to four phase values just as in QPMACE design. In such a case, the filter phase and the input Fourier transform phase are more likely to cancel each other, leading to a sharp correlation peak. This process may be referred to as a 4-level correlator (essentially quantizing the Fourier transform of the test input image to 2 bits/pixel used in conjunction with a QPMACE filter). The correlation outputs resulting from the 4-level correlator are shown in FIGS. 8A and 8B, where FIG. 8A shows an exemplary correlation output from the MACE filter and FIG. 8B shows exemplary correlation output from the QPMACE filter using a 4-level correlator. It is seen that the outputs in FIGS. 8A and 7A are identical, however the peak is significantly sharper in the output in FIG. 8B as compared to the correlation output in FIG. 7B where the QP-MACE filter was used with full phase correlation.

It is noted here that the terms "2 bits/pixel" and "2 bits/frequency" are used synonymously in the discussion herein. Both of these terms mean the same in the sense that an N×N image has an FFT of size N×N (i.e., the number of pixels is the same as the number of frequencies). Also, it is known in the art that sometimes each frequency is just called a "pixel" with the implicit understanding that a frequency domain array is being referred to.

In an experiment, a single MACE filter was synthesized using 3 training images (depicting extreme light variation) for each person. Images no. 3, 7, 16 were used from each person to synthesize their MACE filter. This was repeated to synthesize QP-MACE filters. Each filter was then cross-correlated with the whole database to examine the verification performance. As noted before, the PIE database contains images of 65 people each with 21 images captured under varying illumination conditions. The face images were extracted and normalized for scale using selected ground truth feature points provided with the database. The resulting face images used in the experiments were of size 100×100 pixels. Thus, in this experiment, the same image numbers were selected for every one of the 65 people, and a single MACE filter was synthesized for each person from those images using equation (7) and similarly a reduced memory QPMACE filter was also synthesized using equation (17). For each person's filter, a cross-correlation was performed with the whole dataset (65*21 =1365 images), to examine the resulting PSRs for images from that person and all the other impostor faces. This process was repeated for all people (a total of 88,725 cross-correlations), for each of the two illumination datasets (with and without background lighting).

Figure 9A:
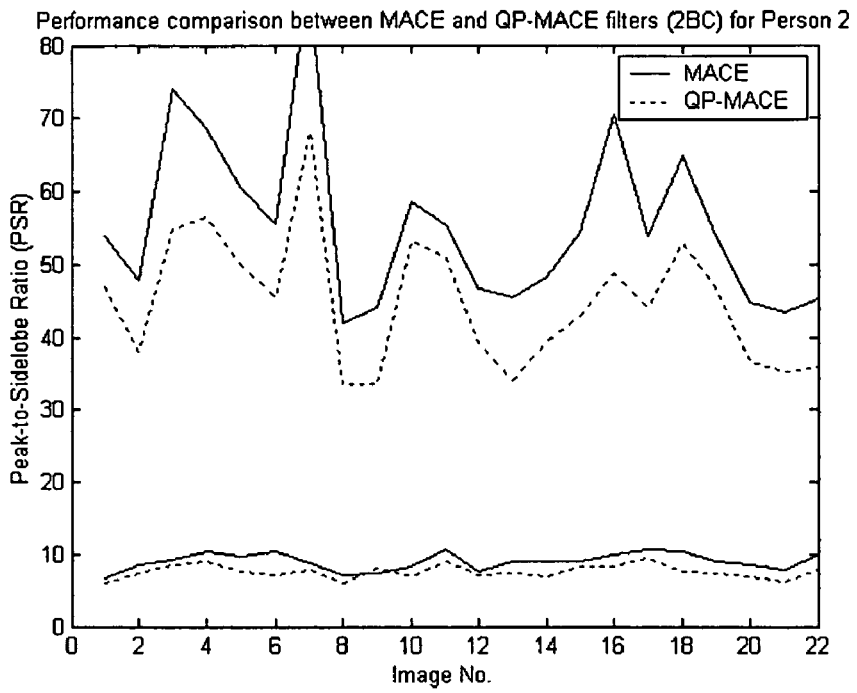
FIGS. 9A, 9B show Peak-to-Sidelobe Ratio (PSR) comparison between MACE and Quad-Phase MACE filters using the 4-level correlator on the PIE-NL (no lights) dataset for Person 2.
Figure 9B:
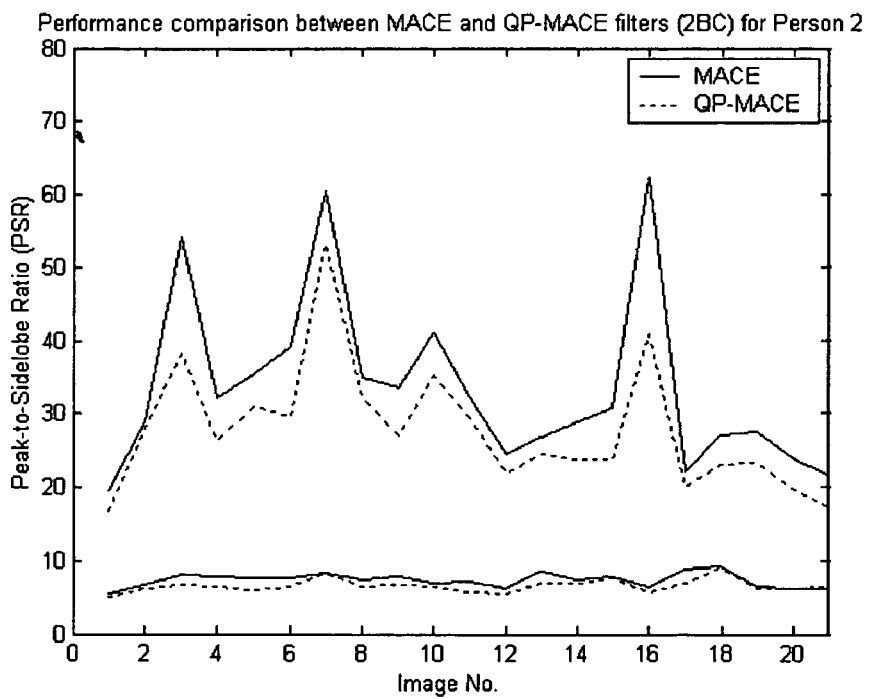

FIG. 9A and FIG. 9B show the Peak-to-Sidelobe Ratio (PSR) plots for person 2 from the PIE-L (FIG. 9A) and the PIE-NL (FIG. 9B) databases, respectively, when using the full complexity MACE filter as well as the 4-level correlator using QPMACE filters. It is seen from these figures that while there is some loss of PSR performance when using the QPMACE filter, it is small. In fact, the 4-level correlator employing QPMACE filters still achieved 100% verification on both PIE-NL and PIE-L databases (for all 65 people), achieving same verification performance as the full complexity MACE filter. This can be seen from the fact the PSR curves for the authentics (the top two plots in FIGS. 9A and 9B) and the impostors (the bottom two plots in FIGS. 9A and 9B depicting the maximum impostor PSR among all impostors) can be completely separated by a single threshold.

The three distinct peaks shown in FIG. 9B are those that belong to the 3 training images (#3, #7, #16) used to synthesize person 2's filter. It is observed that while there is a degradation in PSR performance using QP-MACE filters, this degradation is non-linear, i.e., the PSR degrades more for very large PSR values (but still provides a large margin of separation from the impostor PSRs) of the full complexity MACE filters, but this may not be the case for low PSR values resulting from the original full complexity MACE filters. It is observed from FIGS. 9A and 9B that the impostor PSRs which are in the 10 PSR range and below, QPMACE filter achieves very similar performance as the full-phase MACE filters.

Another observation that was consistent throughout all 65 people is that the impostor PSRs are consistently below some threshold (e.g., 12 PSR). This observed upper bound was irrespective of illumination or facial expression change. This property may make MACE type correlation filters ideal for verification because a fixed global threshold may be selected (above which the user is authorized) which is irrespective of what type of distortion occurs, and even irrespective of the person to be authorized. In contrast, however, this property does not hold in other approaches such as traditional Eigenface or IPCA methods, whose residue or distance to face space is highly dependent on illumination changes.

Figure 10A:
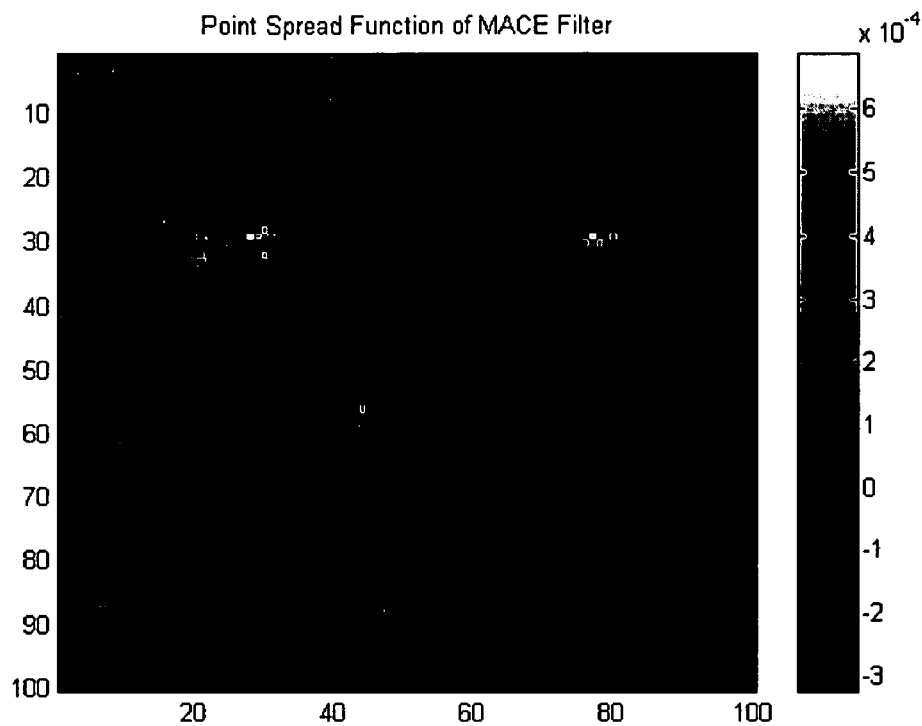
FIGS. 10A, 10B show the Point Spread Function (PSF) of the full complexity MACE filter and the PSF of the QP-MACE filter synthesized for Person 2 for comparison.
Figure 10B:
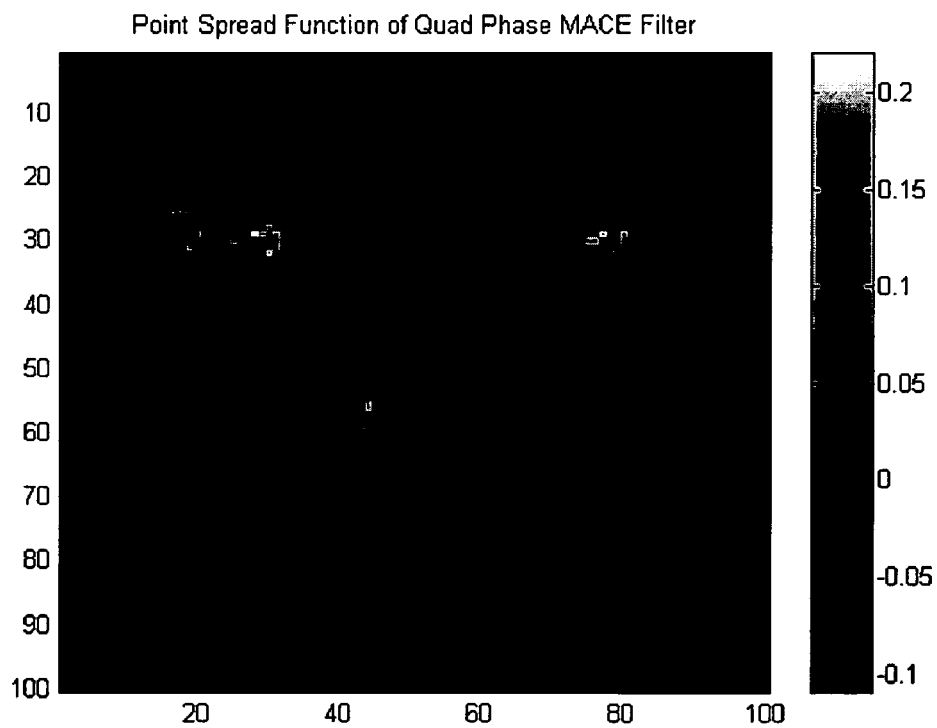

Some benefits of frequency domain quantization can be seen by examining the point spread functions (PSF) of the full-phase MACE filter and the QPMACE filter in FIG. 10A and FIG. 10B, respectively. PSF is the inverse Fourier transform of the filter. Clearly, the visible face features are preserved in the QPMACE filter. In fact, the QPMACE point spread function looks more like the original face (except for the positive/negative template values). This is because QPMACE filter is an all-pass filter, allowing equal contributions from the low frequency (more salient features of the face) and high frequency components. In contrast, full-complexity MACE filters emphasize higher frequency components to obtain a near flat spectrum and in the process emphasizes higher frequency features (therefore, only edge outlines of mouth, nose, eyes, and eye brows are visible). A majority of illumination variations affect the lower spatial frequency content of images, and these frequencies are attenuated by the MACE filters, hence the output is unaffected. Shadows, for example, will introduce new features that have higher spatial frequency content, however, MACE filters look at the whole image and do not focus at any one single feature, thus these types of filters provide a graceful degradation in performance as more distortions occur.

Figure 11:
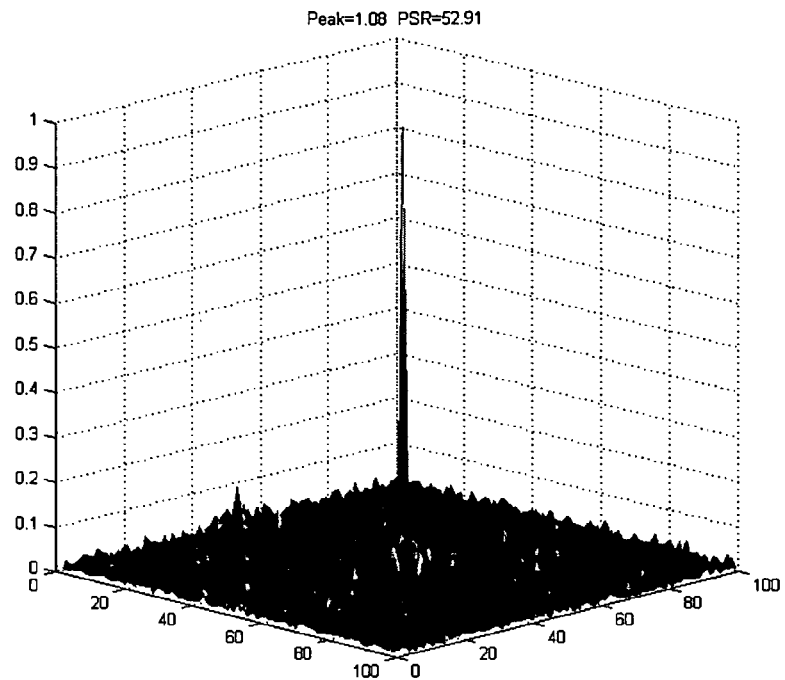
FIG. 11 shows the correlation output resulting from the QPMACE Filter (synthesized from QP-FFT Training images) in conjunction with the 4-level correlator.
Figure 12:
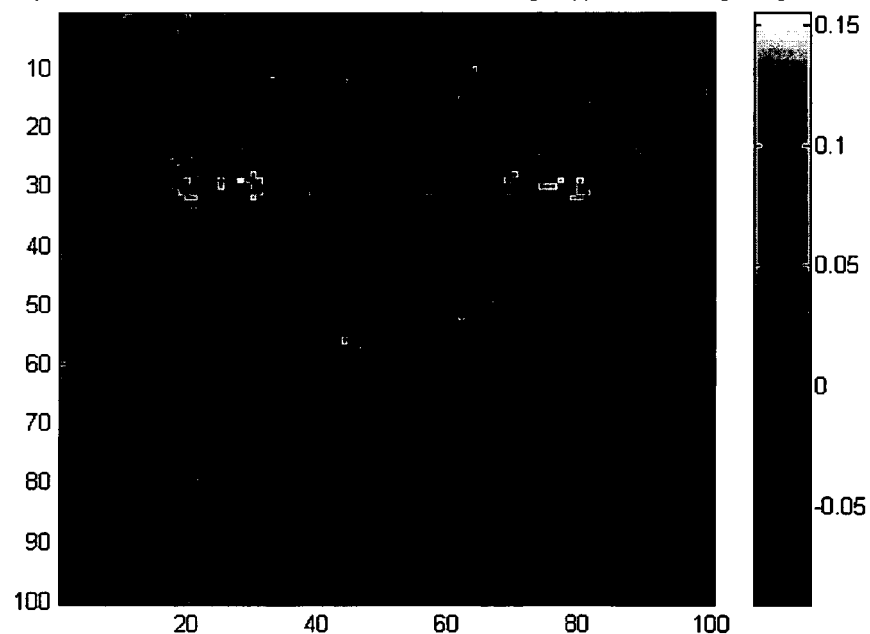
FIG. 12 shows Point Spread Function of the Quad-Phase MACE filter synthesized from the Quad-Phase training images (in the Fourier domain) of Person 2.
Figure 13A:
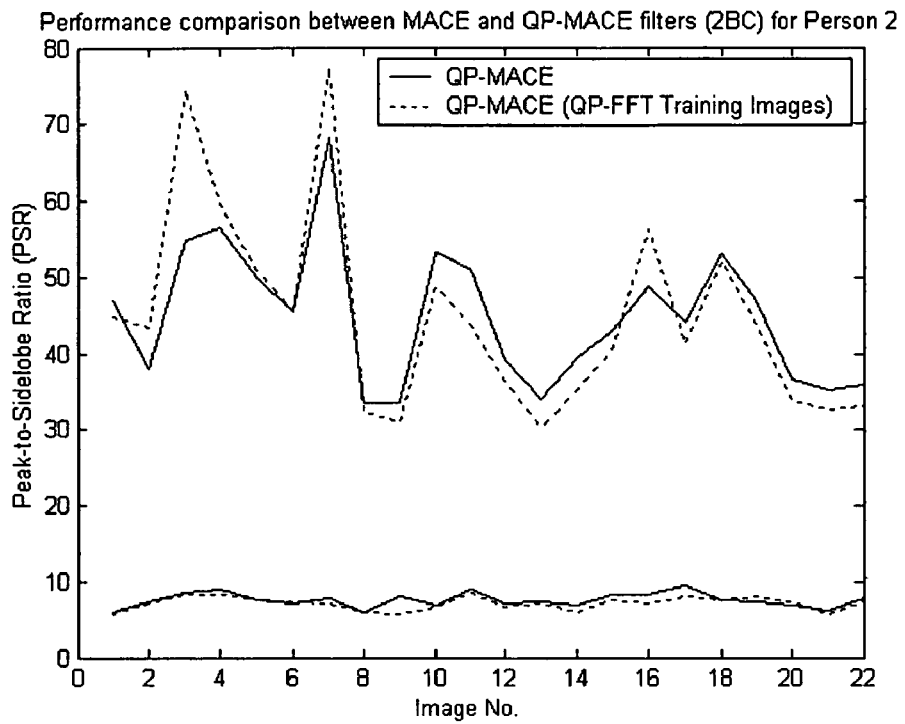
FIGS. 13A, 13B show PSR comparison between MACE and Quad-Phase MACE filters using the 4-level correlator on the PIE-NL (no lights) dataset for Person 2.
Figure 13B:
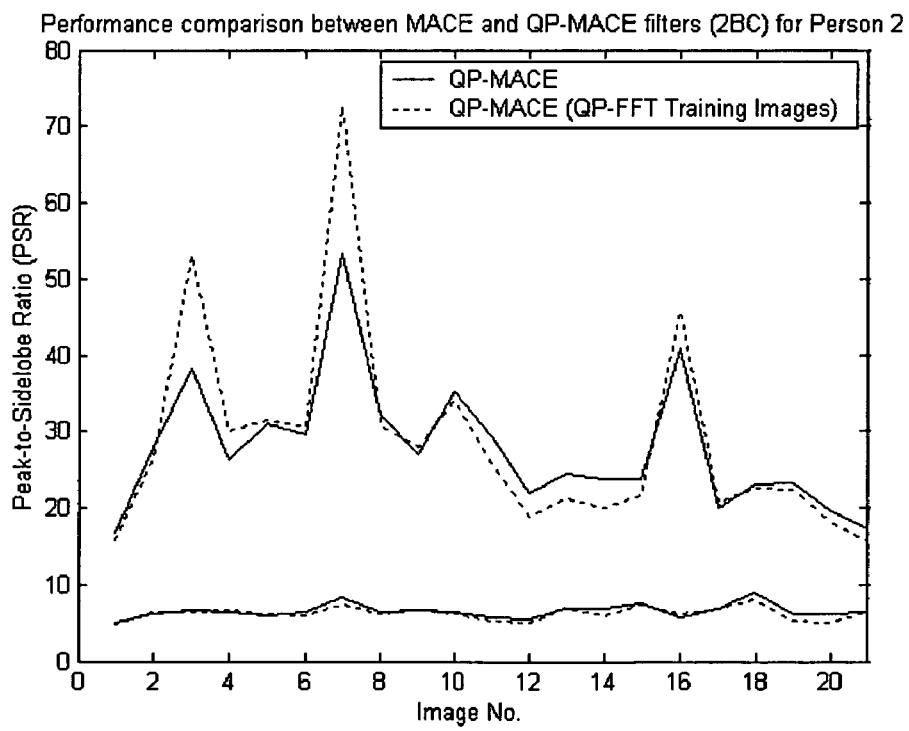

It is noted that QPMACE filters may be produced not only by quantizing the final full phase MACE filters to the exemplary 4 phase levels $\{¼\pi, ¾\pi, 5/4\pi, 7/4\pi\}$, but by also synthesizing the quad phase MACE filter using quad phase only versions of the Fourier transforms of training images. This has important implications in memory-limited platforms that operate with limited precision, where this might be a computationally attractive solution to storing the training images in frequency domain for synthesizing these filters. In this specific example of using MACE filters, the user typically (but not necessarily) may store all the training images before synthesizing the MACE filter. Because phase information captures most of the image information, the user may synthesize QPMACE filters from quad-phase only Fourier transforms (QP-FFT) of training images. When a 4-level correlator is used, it may be reasonable to conclude that using the same type of quantized Fourier transforms of input images during testing might in fact improve performance. In general the quantized MACE filter would be synthesized from quantized Fourier transform training images. FIG. 11 shows the sharp correlation peaks (peak value=1.08, PSR=52.91) from the QPMACE filter designed from the quad phase only Fourier transforms of the training images. The point spread function of the QPMACE filter synthesized from the QP-FFT training images is shown in FIG. 12, which illustrates that this filter is able to retain the main facial structure. In the PSR plots in FIG. 13A and FIG. 13B, the dotted curves represent the QPMACE filters synthesized from QP-FFT training images and yield higher PSRs for some of the images than the QPMACE filters.

In the example above, the reduced complexity scheme was applied to MACE filter. However, the reduced complexity scheme may be applied to any of the other correlation filter designs. In particular, from a computational viewpoint, the unconstrained MACE (UMACE) filter may be considered to achieve verification performance similar to the MACE filter. Further, UMACE filters are significantly easier to construct than the MACE filter as the cost for building UMACE filters increases linearly with the number of images; i.e., as more images are added to the training set, there are more vectors that have to be added to compute the mean and average power spectrum. Clearly, one advantage of using UMACE filters is that one can build these filters incrementally in an easy fashion. That is, given a new training image, one only needs to update the mean image vector m and the average power spectrum matrix D.

From equation (11), it is seen that since D is a diagonal matrix, the elements of the mean image in the frequency domain are divided by the elements of D along its diagonal. Therefore, it is not necessary to divide by the number of training images to form the mean image and the average power spectrum as the scalar divisor cancels out as follows. Thus, UMACE filter formulation can be simplified even further.

$$h_{UMACE} = D^{-1}m$$

$$h_{UMACE} = D^{-1}m \qquad (18)$$
$$= \left[\frac{1}{N}\sum_{i=1}^{N}(X_i' X_i'^*)\right]^{-1} \frac{1}{N}\sum_{i=1}^{N} X_i$$
$$= D'm'$$

where $X_i'$ is a diagonal matrix containing the Fourier transform of the ith training image lexicographically re-ordered and placed along the diagonal. Similarly, $x_i$ contains the same Fourier transform re-ordered into a 1-D column vector.

In general, the mean image vector m and the average power spectrum matrix D would be in the following form.

$$D'_{n+1} = \frac{nD'_n + X'_{n+1} X'^*_{n+1}}{n+1} \qquad (19)$$

$$m'_{n+1} = \frac{nm'_n + x_{n+1}}{n+1} \qquad (20)$$

Thus, given a new image $X_{n+1}$, one can incrementally update using the following simplified recurrent equations for m and D for the UMACE filter.

$$D'_{n+1} = D'_n + X'_{n+1} X'^*_{n+1} \qquad (21)$$

$$m'_{n+1} = m'_n + x_{n+1} \qquad (22)$$

where $X'_{n+1}$ is a diagonal matrix containing the Fourier transform of the training image at time step (n+1), lexicographically re-ordered and placed along the diagonal. Therefore, for incrementally synthesizing a Quad Phase UMACE filter, one can simplify the update process further showing that one only needs to store and update the mean image or simply $m'_{n+1}$ because as the power spectrum is positive it will not affect the sign of the elements in the UMACE filter in equation (18). Therefore, the same QP-UMACE filters are formed. This would be advantageous for use with the quantized 2 bit/frequency FFT training images as the dynamic range is limited with the number of training images used to synthesize the filter, one can get away without having to perform divisions by N, the number of training images.

It is noted that one can also form QPUMACE filters in the same fashion as before.

$$H_{QPUMACE}(u,v) = \begin{cases} +1 & \text{Re}(H_{UMACE}) \geq 0 \\ -1 & \text{Re}(H_{UMACE}) < 0 \\ +j & \text{Im}(H_{UMACE}) \geq 0 \\ -j & \text{Im}(H_{UMACE}) < 0 \end{cases} \quad (23)$$

That is, similar to equation (17A), the QPUMACE filter may be represented by the following equation for simplicity:

$$H_{QPUMACE}(u,v) = Sgn[Re\{H_{UMACE}(u,v)\}] + jSgn[Im\{H_{UMACE}(u,v)\}] \quad (23A)$$

Where Sgn[x] is "+1" for x greater than or equal to 0, and "−1" for x<0. One can simplify the computation of synthesizing reduced complexity UMACE filters in the special case of using 4 phase levels. Examining the UMACE filter in Eq. (11), it is seen that dividing the mean m by the diagonal elements of the average power spectrum matrix D (which contains only positive diagonal elements) cannot change the signs of the real part and the imaginary part of m (which is what is required to compute the QPUMACE as shown in Eq. (23A)). Thus, matrix D may not affect the resulting QPUMACE filter and may not have to be updated or computed. Therefore, for QPUMACE filters only, the filter synthesis simplifies to the following in Eq. (24). Thus, one only needs to store and update the mean vector m.

$$H_{QPUMACE}(u,v) = \begin{cases} +1 & \text{Re}(m) \geq 0 \\ -1 & \text{Re}(m) < 0 \\ +j & \text{Im}(m) \geq 0 \\ -j & \text{Im}(m) < 0 \end{cases} \quad (24)$$

The above equation (Eq. (24)) may be represented by the following equation for simplicity:

$$H_{QPUMACE}(u,v) = Sgn[Re\{m(u,v)\}] + jSgn[Im\{m(u,v)\}] \quad (24A)$$

Where, as before, Sgn[x] is "+1" for x greater than or equal to 0, and "−1" for x<0. This shows that for the special case of using 4-phase levels, the filter can be formulated directly by looking at the sign bits of the average Fourier transform of the training images.

Similarly, a more efficient system using QPUMACE filter can also be synthesized from 2 bits/frequency training images, thus saving on workspace memory.

In this very special case of using 4 phase levels, it can be generalized that all unconstrained correlation filters (e.g., UMACE, UOTSDF, MACH) result in the same reduced complexity filter as given in Eq. (24), i.e., that the reduced complexity filter only needs the sign bits of the average Fourier transform of the training images. This is of great significance as it eliminates the need to decide which filter type to use (among the UMACE, UOTSDF, MACH) while providing a significant reduction in design complexity and still retaining very good recognition performance when used in conjunction with the 4-level correlator.

It is observed that there are many application scenarios where training and recognition is to be performed with limited computational resources. The following discussion concentrates on how to synthesize constrained MACE filters efficiently by using computationally efficient methods of computing the inverse of $(X^+D^{-1}X)^{-1}$ needed in the MACE formulation. Examining the MACE filter equation (7), it can be rewritten in the following form.

$$h = D^{-0.5}D^{-0.5}X(X^+D^{-0.5}D^{-0.5}X)^{-1}u \quad (25)$$
$$= D^{-0.5}(D^{-0.5}X)((D^{-0.5}X)^+(D^{-0.5}X))^{-1}u$$
$$= D^{-0.5}X'(X'^+X')^{-1}u$$

where $$X' = D^{-0.5}X \quad (26)$$

It is seen from the above that X' is nothing but the original Fourier transformed training images X pre-whitened by the average power spectrum D.

Writing in the format given in equation (25) allows one to form an alternative way of incrementally computing the inverse of the inner-product matrix (also commonly referred to as the Gram matrix) (X'+X') as given below.

$$(X_t'^T X_t')^{-1} = \begin{bmatrix} (X_{t-1}'^T X_{t-1}')^{-1} & 0^T \\ 0^T & 0 \end{bmatrix} + \dots + \quad (27)$$
$$k_t^{-1} \begin{bmatrix} (X_{t-1}'^T X_{t-1}')^{-1} X_{t-1}'^T x_t \\ 1 \end{bmatrix} \begin{bmatrix} -(X_{t-1}'^T x_t)^T (X_{t-1}'^T X_{t-1}')^{-1} & 1 \end{bmatrix}$$

where the scalar constant $k_t$ is defined as $$k_t = x_t^T x_t - (X_{t-1}'^T x_t)^T (X_{t-1}'^T X_{t-1}')^{-1} (X_{t-1}'^T x_t) \quad (28)$$

Equations (27) and (28) can be computationally simpler to compute than the direct inverse for large number of training images. The only other constraint that must be satisfied to compute the matrix inverse is that the training image at time instant "t" must not be a linear combination of any previous training images as this may result in $X_t'^T X_t'$ being singular. Therefore, it may be desirable to test whether the determinant of $X_t'^T X_t'$ is non-zero with the addition of each new training image. It is noted that the pre-whitening step does not affect the linear independence of the column space, hence, one can equivalently test the determinant of $X_t'^T X_t'$ if desired.

Computing the determinant using standard techniques is very expensive. Therefore, a more efficient way to test for linear independence may be desirable. The Gram matrix $X_t'^T X_t'$ has a special structure that can be exploited to formulate an efficient iterative method to compute the determinant as new images are collected.

$$X_t'^T X_t' = \begin{bmatrix} X_{t-1}'^T \\ x_t'^T \end{bmatrix} [X_{t-1}' \ x_t'] = \begin{bmatrix} X_{t-1}'^T X_{t-1}' & X_{t-1}'^T x_t' \\ x_t'^T X_{t-1}' & x_t'^T x_t' \end{bmatrix} \quad (29)$$

It is noted that the constant term $k_t$ in equation (28) is known as the Schur complement of the partitioned Gram matrix $X_t'^T X_t'$ given above in equation (29). Assuming that $X_{t-1}'$ has linearly independent columns, then the linear combination vector $e_t$ will be zero vector only if the image $x_t$ is a linear combination of the other training images.

$$e_t = [X_{t-1}' x_t] a_t \quad (30)$$

The norm squared of the error $e_t$ is $(e_t^T e_t)$, which is also known as the Schur complement of $X_t'^T X_t'$, can be computed as shown as $k_t$ in equation (28).

As discussed in Louis L. Scharf, "*Statistical Signal Processing-Detection, Estimation, and Time-Series Analysis*", Addison-Wesley Publishing Company (1991), it can be shown that the determinant of the Gram matrix can be iteratively computed as follows:

$$\det(X_t'^T X_t') = k_t \det(X_{t-1}'^T X_{t-1}') = \prod_{t=1}^{t} k_t \quad (31)$$

The $\det(X_{t-1}'^T X_{t-1}')$ is nonzero only if $k_t$ is non-zero. Therefore, one may only need to compute and test if the Schur complement of the augmented Gram matrix $X_t'^T X_t'$ is nonzero with the addition of each new training image. This is a computationally more efficient way to test for linear independence given a new training image.

Online Training Scheme for Synthesizing Distortion Tolerant Correlation Filters

Figure 14:
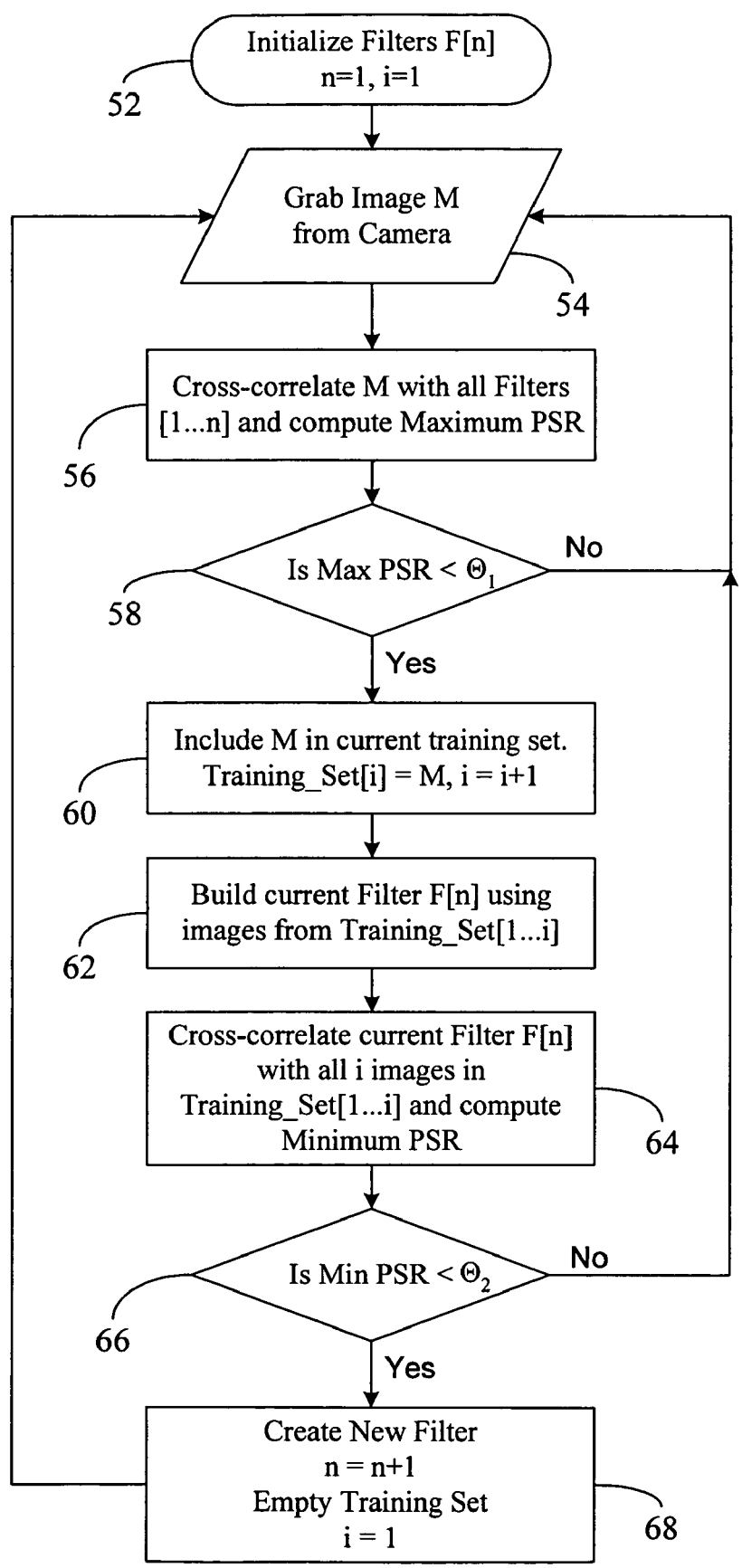
FIG. 14 is an exemplary flow diagram of an online training algorithm for synthesizing correlation filters according to one embodiment of the present disclosure.

The performance of any recognition system may depend heavily on the choice of training images. The following discussion relates to an online-training algorithm for synthesizing correlation filters. FIG. 14 is an exemplary flow diagram of the online training algorithm for synthesizing correlation filters, preferably MACE filters, according to one embodiment of the present disclosure. Although the discussion is provided in the context of enrolling a person in a face authentication system, it is noted that this scheme may be used for any other applications as well. Further, although the discussion focuses on MACE filters, the training image selection method outlined in FIG. 14 may be used with any other correlation filter. The advanced correlation filters described hereinbefore are attractive because they allow one to synthesize a single filter template from multiple training images. A question that can arise is: what is the maximum limit of training images that can be used to synthesize a single filter? It is observed that currently there is no clear way to quantify this because the number of training images depends on the amount of variability present in these training images. As pointed out earlier, MACE filters perform a correlation energy minimization. Therefore, it may be logical to expect that training images with a larger range of variability will synthesize filters that are not able to minimize the average correlation energy in comparison to training sets with smaller variations. Thus, the resulting PSRs are smaller for the filter synthesized from a larger variation training set. This includes the PSRs obtained even from the training images used to synthesize the filter.

Therefore one possible way to quantify the quality of a MACE filter is to measure the PSRs (or a similar figure-of-merit) resulting from each of the training images that were used in synthesis. Step 64 in FIG. 14 depicts this PSR computation process. If these PSRs (i.e., the minimum values of these PSRs) are smaller than some threshold $\theta_2$ (step 66), then this filter is not capable of performing well, as one expects the PSRs resulting due to test images to be less than that of the training images. If the training image PSRs are low to begin with, then the filter may not be able to provide sufficient discrimination. A new training image may be selected in this case (step 68), otherwise the image M may remain included in the current training set if the condition at step 66 is not satisfied.

During the enrollment process, one may have collected a video stream of face images, and the assumption one can make is that the difference in images between successive frames (assuming a reasonable capture frame rate) is not great. Thus one can build a filter from a couple of images (step 52), by obtaining the next frame (block 54) and cross-correlating it with the synthesized filter (step 56). If the computed PSR (i.e., the maximum PSR obtained from all the synthesized filters) is smaller than some threshold $\theta_1$ (step 58), then that means that the current face image is not represented by the synthesized filters. Therefore, it may be desirable to include the current image in the current training set (step 60) and re-synthesize or update the current filter (step 62) using the newly-added image in the training set. After each image is added to the training set, the quality of the updated filter may be tested as described before (steps 64, 66, and 68 in FIG. 14). If the filter has reached its maximum capacity, one may start building a new filter, using the same scheme described hereinabove with reference to FIG. 14. It is noted here that the values of thresholds $\theta_1$ and $\theta_2$ may be flexibly selected at run-time or may be predetermined depending on the type of pattern recognition application and the desired verification accuracy.

While it was shown hereinbefore that MACE filters are tolerant to illumination changes, handling pose changes is a tougher problem. In efforts to produce sharp correlation peaks, these advanced correlation filters emphasize higher spatial frequencies in the images, thereby capturing the relative geometrical structure of the facial features while ignoring the lower spatial frequencies, which are affected the most by illumination conditions. Thus, expected poses of the face images, including scale changes, need to be shown as examples to these filters to correctly classify them during verification. This may be done using an instructive guide in the system, asking the user to exhibit various pose changes as the online-training algorithm is running. The final enrollment process period may then be dependent on how many filters can be stored, and how much variation is exhibited by the user.

Face Localization

In the authentication process, the user is asked to cooperate and place his face in front of the camera. To not constrain the user and for purposes of increasing the speed of the overall verification process, it may be desirable to implement a face localizer which locates the face and centers it for the classification. While correlation-filters are shift invariant, it may still be needed to provide the full face image for reliable verification. For verification purposes, correlation filters need to have a near full face image to perform well and achieve a PSR score above a specific threshold. This may be harder to achieve especially when other distortions, such as pose variations, are present. Therefore, it may be desirable to add a pre-processing step to locate partial face in view of the camera, to automatically capture and process a full face image. When a face image is captured, it is correlated with the stored set of correlation filters, and the maximum PSR achieved is stored along with the location of the correlation peak. This peak location may tell how much the face image is shifted. Thus, one can use the peak location to select and crop out the correct face region. The captured image resolution is typically much higher than the resolution of the face images used for verification. In one embodiment, a region of the captured scene is cropped out, and the image region is downsampled to the resolution desired for performing face verification. The downsampling process of the selected face region in scene allows one to smooth out camera noise by a form of pixel averaging (in comparison to directly capturing a very low resolution image). Also, more importantly, one can first locate the position of the face in the smaller resolution image and estimate the correct face region in the high resolution background image, and then shift the crop window and downsample the estimated region containing the face, and then perform verification. This may be more computationally efficient than performing cross-correlation of a face template on a higher resolution background image to first locate the face, then downsample and perform verification. FIGS. 15A and 15B illustrate the face localization methodology according to one embodiment of the present disclosure. FIG. 15A shows an exemplary captured face image with face location marked with a white cross (the white cross denotes the position of correlation peak). On the other hand, FIG. 15B shows the face in FIG. 15A centered based on the peak location. The full face image in FIG. 15B is captured based on estimated face location. Face identification can be performed by simply enrolling many people in the verification system.

It is noted here that the term "biometric verification" (1:1 matching) refers to matching the live biometric to the stored biometric of a claimed identity, whereas the term "biometric identification" (1:N matching) refers to best match among N stored biometrics for a live biometric. The face recognition process may usually encompass both face verification and face identification. It is noted here that the face localization discussion given above applies to both face verification as well as face identification (or to any other biometric verification and identification process). For verification, it is checked to see if PSR exceeds a threshold or not. On the other hand, for identification, N PSRs may be computed for the N filters and the input image may be assigned to that filter which yields the largest PSR.

FIG. 16 illustrates one type of apparatus, PDA (Personal Digital Assistant) 70, upon which various methods of the present disclosure, e.g., the methods of FIGS. 4 and 5, may be practiced. Other types of hardware, e.g., cell phones, digital cameras, and the like may also be used as platforms for the present invention. In FIG. 16, the PDA 70 has a touch sensitive screen 72. The PDA 70 may also have one or more of the following: a camera or other imaging device 74, electronics for establishing a wireless internet connection 76, a microphone 78, and a speaker 80. The PDA 70 may carry a memory (e.g., a flash memory) (not shown) for storing the software necessary to implement various processes described hereinbefore (e.g., the processes shown in FIGS. 4, 5, and 14). Alternatively, the PDA 70 may access such software, when needed, through wired or wireless internet connection 76. The software may also be stored in a portable data storage medium (e.g., a compact disc, a floppy diskette, a microdrive, a USB (Universal Serial Bus) memory device, or a digital data storage medium) (not shown) for installation and execution in the PDA 70 or other data processing or computing device. The apparatus shown in FIG. 16 is intended to be exemplary only and not limiting.

The foregoing describes a methodology to reduce the complexity (memory requirement of only 2 bits/pixel in frequency domain) of correlation filters for face recognition. Reduced-complexity correlations are achieved by having quantized MACE, UMACE, OTSDF, UOTSDF, MACH, and other filters, in conjunction with a quantized Fourier transform of the input image. This reduces complexity in comparison to the advanced correlation filters using fall-phase correlation. However, the verification performance of the reduced complexity filters is comparable to that of full-complexity filters. A special case of using 4-phases to represent both the filter and training/test images in the Fourier domain leads to further reductions in the computational formulations as shown, for example, in the case of unconstrained correlation filters (leading to requiring only the storage and update of the mean Fourier transform of the training images in incremental updating). This also enables the storage and synthesis of filters (e.g., MACE filters) in limited-memory and limited-computational power platforms such as PDAs, cell phones, etc. An online training algorithm implemented on a face verification system is described for synthesizing correlation filters to handle pose/scale variations. A way to perform efficient face localization is also discussed.

It is noted here that although the discussion given hereinabove has been with reference to correlation filters, the quantized FFT values according to present methodology may be used for any other filters. The correlation filters are discussed herein because of their widespread use in pattern recognition applications where filters of interest are those that produce correlation outputs. However, other non-correlation filters and their corresponding applications may also be configured to utilize the quantization methodology according to the present disclosure.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method, comprising using a processor to perform the following steps:
    obtaining a Fourier Transform (FT) of a first image;
    obtaining an M-level quantization of one or more frequency samples contained in said FT of said first image, wherein said M-level quantization produces a first set of quantized values;
    constructing a filter using said first set of quantized values;
    obtaining an FT of a second image;
    obtaining an N-level quantization of one or more frequency samples contained in said FT of said second image, wherein said N-level quantization produces a second set of quantized values and the value of N varies with the frequency of the frequency sample of said second image being quantized; and
    applying said filter to said second set of quantized values.

2. The method of claim 1 wherein N and M are equal.

3. The method of claim 1 wherein the level of quantization of the phase of the frequency samples is four, said method further comprising storing said filter in an electronic memory using two bits per frequency for storage.

4. The method of claim 1 wherein said filter is one of the following types:
    a minimum average correlation energy (MACE) filter;
    an unconstrained MACE filter;
    an optimal trade-off synthetic function discriminant (OTSDF) filter;
    an unconstrained OTSDF filter; and
    a maximum average correlation height filter.

5. A computer readable medium storing a set of instructions which, when executed, causes a processor to perform a method, comprising:
    obtaining a Fourier Transform (FT) of a first image;
    obtaining an M-level quantization of one or more frequency samples contained in said FT of said first image, wherein said M-level quantization produces a first set of quantized values;
    constructing a filter using said first set of quantized values;
    obtaining an FT of a second image;
    obtaining an N-level quantization of one or more frequency samples contained in said FT of said second image, wherein said N-level quantization produces a second set of quantized values and the value of N varies with the frequency of the frequency sample of said second image being quantized; and applying said filter to said second set of quantized values.

6. The medium of claim 5 wherein N and M are equal.

7. The medium of claim 5 wherein the level of quantization of the phase of the frequency samples is four, said method further comprising storing said filter in an electronic memory using two bits per frequency for storage.

8. The medium of claim 5 wherein said filter is one of the following types:
- a minimum average correlation energy (MACE) filter;
- an unconstrained MACE filter;
- an optimal trade-off synthetic function discriminant (OTSDF) filter;
- an unconstrained OTSDF filter; and
- a maximum average correlation height filter.

9. A computer system, comprising:
- a processor coupled to a computer readable memory device storing a set of instructions which, when executed, cause said processor to perform a method, comprising:
- obtaining a Fourier Transform (ET) of a first image;
- obtaining an M-level quantization of one or more frequency samples contained in said FT of said first image, wherein said M-level quantization produces a first set of quantized values;
- constructing a filter using said first set of quantized values;
- obtaining an FT of a second image;
- obtaining an N-level quantization of one or more frequency samples contained in said FT of said second image, wherein said N-level quantization produces a second set of quantized values and the value of N varies with the frequency of the frequency sample of said second image being quantized; and
- applying said filter to said second set of quantized values.

10. The system of claim 9 wherein N and M are equal.

11. The system of claim 9 wherein the level of quantization of the phase of the frequency samples is four, said method further comprising storing said filter in an electronic memory using two bits per frequency for storage.

12. The system of claim 9 wherein said filter is one of the following types:
- a minimum average correlation energy (MACE) filter;
- an unconstrained MACE filter;
- an optimal trade-off synthetic function discriminant (OTSDF) filter;
- an unconstrained OTSDF filter; and
- a maximum average correlation height filter.

* * * * *

UNITED STATES PATENT AND TRADEMARK OFFICE
CERTIFICATE OF CORRECTION

PATENT NO. : 7,483,569 B2
APPLICATION NO. : 10/857072
DATED : January 27, 2009
INVENTOR(S) : Vijayakumar Bhagavatula and Marios Savvides It is certified that error appears in the above-identified patent and that said Letters Patent is hereby corrected as shown below:

Column 5, Line 5, after "value" insert -- ) --.

Column 13, Line 21, delete "that the although" and substitute therefore

-- that although --.

Column 21, Line 17, after "refers to" insert -- the --.

Column 23, Line 22, delete "(ET)" and substitute therefore -- (FT) --.

Signed and Sealed this

Thirty-first Day of March, 2009

JOHN DOLL
*Acting Director of the United States Patent and Trademark Office*